US008603354B2

(12) United States Patent
Kaneko

(10) Patent No.: US 8,603,354 B2
(45) Date of Patent: Dec. 10, 2013

(54) LUBRICATING OIL COMPOSITION FOR REFRIGERATORS

(75) Inventor: Masato Kaneko, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/315,845

(22) Filed: Dec. 9, 2011

(65) Prior Publication Data
US 2012/0083431 A1 Apr. 5, 2012

Related U.S. Application Data

(63) Continuation of application No. 12/513,235, filed as application No. PCT/JP2007/071289 on Nov. 1, 2007, now abandoned.

(30) Foreign Application Priority Data

Nov. 2, 2006 (JP) ................................. 2006-299418

(51) Int. Cl.
C09K 5/04 (2006.01)
F25B 43/02 (2006.01)

(52) U.S. Cl.
USPC ................................................ 252/68; 62/84

(58) Field of Classification Search
USPC ................................................ 252/68; 62/84
See application file for complete search history.

(56) References Cited

U.S. PATENT DOCUMENTS

| 5,137,650 | A | | 8/1992 | Kaneko | |
|---|---|---|---|---|---|
| 5,484,546 | A | * | 1/1996 | Minor et al. | 252/67 |
| 5,648,016 | A | | 7/1997 | Klug et al. | |
| 5,801,132 | A | | 9/1998 | Kaneko et al. | |
| 5,858,266 | A | | 1/1999 | Kaneko | |
| 5,954,995 | A | * | 9/1999 | Goble | 252/67 |
| 5,997,761 | A | | 12/1999 | Kaneko | |
| 6,008,169 | A | * | 12/1999 | Kaneko | 508/501 |
| 6,074,573 | A | * | 6/2000 | Kaneko | 252/68 |
| 6,156,224 | A | * | 12/2000 | Yoshida et al. | 252/67 |
| 6,454,960 | B1 | | 9/2002 | Sunaga et al. | |
| 7,824,567 | B2 | | 11/2010 | Kaneko | |
| 8,070,978 | B2 | | 12/2011 | Kaneko | |
| 8,349,206 | B2 | * | 1/2013 | Kaneko | 252/68 |
| 2004/0089839 | A1 | | 5/2004 | Thomas et al. | |
| 2004/0099838 | A1 | | 5/2004 | Leck et al. | |
| 2004/0157753 | A1 | * | 8/2004 | Tazaki et al. | 508/462 |
| 2004/0180796 | A1 | * | 9/2004 | Iwata et al. | 508/103 |
| 2005/0242323 | A1 | | 11/2005 | Leck et al. | |
| 2006/0251348 | A1 | | 11/2006 | Egami et al. | |
| 2010/0029522 | A1 | | 2/2010 | Tokiai et al. | |
| 2010/0133463 | A1 | | 6/2010 | Kaneko et al. | |
| 2010/0147016 | A1 | | 6/2010 | Kaneko et al. | |
| 2010/0175421 | A1 | | 7/2010 | Kaneko et al. | |
| 2010/0234256 | A1 | | 9/2010 | Sato et al. | |
| 2010/0252772 | A1 | | 10/2010 | Kaneko | |
| 2011/0023531 | A1 | * | 2/2011 | Kaneko et al. | 62/468 |
| 2011/0049414 | A1 | * | 3/2011 | Kaneko et al. | 252/68 |
| 2011/0057146 | A1 | * | 3/2011 | Kaneko et al. | 252/68 |
| 2011/0136712 | A1 | | 6/2011 | Kaneko | |
| 2011/0306532 | A1 | | 12/2011 | Kaneko | |

FOREIGN PATENT DOCUMENTS

| EP | 498 152 | 8/1992 |
|---|---|---|
| JP | 2-134461 | 11/1990 |
| JP | 3-12497 | 1/1991 |
| JP | 06-287586 | 10/1994 |
| JP | 7-138588 | 5/1995 |
| JP | 7-507342 | 8/1995 |
| JP | 10-231491 | 9/1998 |
| JP | 2001-98290 | 4/2001 |
| JP | 2001-280728 | 10/2001 |
| JP | 2001-311088 | 11/2001 |
| JP | 2005-535755 | 11/2005 |
| JP | 2006-503961 | 2/2006 |
| TW | 2005-06237 | 2/2005 |
| WO | WO2005/049760 | 6/2005 |
| WO | WO2005/103192 | 11/2005 |
| WO | WO 2006/094303 A2 | 9/2006 |

OTHER PUBLICATIONS

CAS reg. No. 421-14-7, Nov. 16, 1984.*
Extended European Search Report issued Sep. 16, 2011 in Patent Application No. 07831023.2.
"Glymes—High-powered solvents that make a difference", Media Release, Clariant International LTD, http://www.clariant.com/C125720D002B963C/picklist/25AAAF81B1909B2EC125723400423BCC/$file/MR_FUN_20040503.pdf, XP 55006777 May 3, 2004, pp. 1-4.
"Ethylene glycol dimethyl ethers", CLARIANT, http://www.clariant.de/bu/ics/internet.nsf/vwWebPagesByID/9BB1ED275AC0994FC125770C003894DD?OpenDocument, XP 55006779, Jan. 1, 2011, p. 1.
International Search Report in International Application No. PCT/JP2007/071289, dated Feb. 12, 2008.
European Office Action in Application No. 07 831 023.2-2104, dated Jun. 6, 2012.
Office Action issued May 27, 2013 in European Application No. 07 831 023.2.
Taiwanese Office Action dated Jun. 10, 2013.

* cited by examiner

Primary Examiner — Douglas McGinty
(74) Attorney, Agent, or Firm — Oblon, Spivak, McClelland, Maier & Neustadt, L.L.P.

(57) ABSTRACT

Provided is a lubricating oil composition for a refrigerator which uses a base oil including as the main component at least one kind of oxygen-containing compounds selected from polyoxyalkylene glycols, polyvinyl ethers, copolymers of poly(oxy)alkylene glycols or monoethers thereof and polyvinyl ethers, polyol esters, and polycarbonates. The lubricating oil composition for a refrigerator is used for a refrigerator that uses, as a refrigerant, a fluorine-containing organic compound, which is a refrigerant applicable to current car air conditioner systems or the like and has a specific polar structure, and has favorable sealing property, a low coefficient of friction factor in a sliding part, and excellent stability as well as excellent compatibility with the refrigerant.

26 Claims, No Drawings

LUBRICATING OIL COMPOSITION FOR REFRIGERATORS

This application is a Continuation of U.S. application Ser. No. 12/513,235, filed on May 1, 2009, abandoned, which is a National Stage of PCT/JP2007/071289 filed on Nov. 1, 2009.

TECHNICAL FIELD

The present invention relates to a lubricating oil composition for a refrigerator. More specifically, the present invention relates to a lubricating oil composition for a refrigerator using, as a refrigerant, a fluorine-containing organic compound containing a specific polar structure. The refrigerant has a low global warming potential and is applicable to, in particular, current car air conditioner systems or the like. The lubricating oil composition for a refrigerator uses a base oil including a specific oxygen-containing compound as a main component.

BACKGROUND ART

In general, a compression refrigerator includes at least a compressor, a condenser, an expansion mechanism (such as an expansion valve), and an evaporator, or further includes a drier, and is structured so that a mixed liquid of a refrigerant and lubricating oil (refrigerator oil) circulates in the closed system. In such compression refrigerator, the temperature in the compressor is generally high, and the temperature in the condenser is generally low, though such general theory is not applicable to a certain kind of such compression refrigerator. Accordingly, the refrigerant and the lubricating oil must circulate in the system without undergoing phase separation in a wide temperature range from low temperature to high temperature. In general, the refrigerant and the lubricating oil have regions where they undergo phase separation at low temperature and high temperature. Moreover, the highest temperature of the region where the refrigerant and the lubricating oil undergo phase separation at low temperature is preferably −10° C. or lower, or particularly preferably −20° C. or lower. On the other hand, the lowest temperature of the region where the refrigerant and the lubricating oil undergo phase separation at high temperature is preferably 30° C. or higher, or particularly preferably 40° C. or higher. The occurrence of the phase separation during the operation of the refrigerator adversely affects the lifetime or efficiency of the refrigerator to a remarkable extent. For example, when the phase separation of the refrigerant and the lubricating oil occurs in the compressor portion, a movable part is insufficiently lubricated, with the result that baking or the like occurs to shorten the lifetime of the refrigerator remarkably. On the other hand, when the phase separation occurs in the evaporator, the lubricating oil having a high viscosity is present, with the result that the efficiency of heat exchange reduces.

A chlorofluorocarbon (CFC), a hydrochlorofluorocarbon (HCFC), or the like has been heretofore mainly used as a refrigerant for a refrigerator. However, such compounds each contain chlorine that is responsible for environmental issues, so investigation has been conducted on a chlorine-free alternative refrigerant such as a hydrofluorocarbon (HFC). A hydrofluorocarbon typified by, for example, 1,1,1,2-tetrafluoroethane, difluoromethane, pentafluoroethane, or 1,1,1-trifluoroethane (hereinafter referred to as "R134a", "R32", "R125", or "R143a", respectively) has been attracting attention, and, for example, R134a has been used in a car air conditioner system.

However, because the influence of the HFC is also concerned from the viewpoint of the global warming, so-called natural refrigerants such as carbon dioxide have attracted attention as alternative refrigerants suitable for environmental protection. The carbon dioxide requires high pressure, and hence cannot be used in the current car air conditioner system.

A refrigerant having a specific polar structure in the molecules such as an unsaturated fluorinated hydrocarbon compound (see, for example, Patent Document 1), a fluorinated ether compound (see, for example, Patent Document 2), a fluorinated alcohol compound, or a fluorinated ketone compound has been found to be a refrigerant which has a low global warming potential and can be used in a current car air conditioner system.

The lubricating oil for a refrigerator that uses the refrigerant is demanded to have favorable sealing property, a low coefficient of friction in a sliding part, and excellent stability as well as excellent compatibility with the refrigerant.

Patent Document 1: 2006-503961 A
Patent Document 2: JP 7-507342 A

DISCLOSURE OF THE INVENTION

Problems to be solved by the Invention

Under the circumstances, an object of the present invention is to provide a lubricating oil composition for a refrigerator using, as a refrigerant, a fluorine-containing organic compound containing a specific polar structure. The refrigerant has a low global warming potential and is applicable to, in particular, current car air conditioner systems or the like. The lubricating oil composition for a refrigerator has favorable sealing property, a low coefficient of friction in a sliding part, and excellent stability as well as excellent compatibility with the refrigerant.

Means for Solving the Problems

The inventors of the present invention have studied extensively to achieve the object. As a result, the inventors found that the object could be achieved by using a specific oxygen-containing compound as a base oil, and preferably using a specific material for a sliding part in a refrigerator. The present invention has been completed based on those findings.

That is, the present invention provides:
(1) a lubricating oil composition for a refrigerator, the refrigerator using a refrigerant including at least one kind of fluorine-containing organic compounds selected from compounds represented by the following molecular formula (A) or including a combination of the fluorine-containing organic compound and a saturated fluorinated hydrocarbon compound, $$C_pO_qF_rR_s \qquad (A)$$

where: R represents Cl, Br, I, or H; p represents an integer of 1 to 6, q represents an integer of 0 to 2, r represents an integer of 1 to 14, and s represents an integer of 0 to 13; and provided that, when q represents 0, p represents 2 to 6 and one or more carbon-carbon unsaturated bonds are included in molecules, in which the composition comprises a base oil including as a main component at least one kind of oxygen-containing compounds selected from polyoxyalkylene glycols, polyvinyl ethers, copolymers of poly(oxy)alkylene glycols or monoethers thereof and polyvinyl ethers, polyol esters, and polycarbonates;

(2) a lubricating oil composition for a refrigerator, the refrigerator using a refrigerant including at least one kind of fluorine-containing organic compounds selected from a fluorinated ether compound, a fluorinated alcohol compound, and a fluorinated ketone compound, or including a combination of the fluorine-containing organic compound and a saturated fluorinated hydrocarbon compound, in which the composition comprises a base oil including as a main component at least one kind of oxygen-containing compounds selected from polyoxyalkylene glycols, polyvinyl ethers, copolymers of poly(oxy)alkylene glycols or monoethers thereof and polyvinyl ethers, polyol esters, and polycarbonates;

(3) the lubricating oil composition for a refrigerator according to the item (1) or (2), in which the base oil has a kinematic viscosity of 2 to 50 mm$^2$/s at 100° C.;

(4) the lubricating oil composition for a refrigerator according to any one of the items (1) to (3), in which the base oil has a number average molecular weight of 500 or more;

(5) the lubricating oil composition for a refrigerator according to any one of the items (1) to (4), in which the base oil has a flash point of 150° C. or higher;

(6) the refrigerator oil composition for a refrigerator according to any one of the items (1) to (5), further including at least one kind of an additive selected from an extreme pressure agent, an oiliness agent, an antioxidant, an acid scavenger, and an anti-foaming agent;

(7) the lubricating oil composition for a refrigerator according to any one of the items (1) to (6), in which the fluorine-containing organic compound in the refrigerant is a fluorinated dimethyl ether;

(8) the lubricating oil composition for a refrigerator according to any one of the items (1) to (6), in which the fluorine-containing organic compound in the refrigerant is a fluorinated methyl alcohol;

(9) the lubricating oil composition for a refrigerator according to any one of the items (1) to (6), in which the fluorine-containing organic compound in the refrigerant is a fluorinated acetone;

(10) the lubricating oil composition for a refrigerator according to any one of the items (1) to (9), in which the saturated fluorinated hydrocarbon compound in the refrigerant is at least one kind selected from 1,1-difluoroethane, trifluoroethane, tetrafluoroethane, and pentafluoroethane;

(11) the lubricating oil composition for a refrigerator according to any one of the items (1) to (10), in which a sliding part in a refrigerator is formed of an engineering plastic or includes an organic coating film or an inorganic coating film;

(12) the lubricating oil composition for a refrigerator according to the item (11), in which the organic coating film is a polytetrafluoroethylene coating film, a polyimide coating film, or a polyamideimide coating film;

(13) the lubricating oil composition for a refrigerator according to the item (11), in which the inorganic coating film is a graphite film, a diamond-like carbon film, a tin film, a chromium film, a nickel film, or a molybdenum film;

(14) the lubricating oil composition for a refrigerator according to any one of the items (1) to (13), which is used in a car air conditioner, an electrically-driven car air conditioner, a gas heat pump, an air conditioner, a cold storage, various hot-water supply systems for a vending machine or a showcase, or a refrigerating and heating system; and

(15) the lubricating oil composition for a refrigerator according to the item (14), in which a water content in a system is 300 mass ppm or less and a residual air content in the system is 10 kPa or less.

Effect of the Invention

According to the present invention, there can be provided a lubricating oil composition for a refrigerator using, as a refrigerant, a fluorine-containing organic compound containing a specific polar structure. The refrigerant has a low global warming potential and is applicable to, in particular, current car air conditioner systems or the like. The lubricating oil composition for a refrigerator has favorable sealing property, a low coefficient of friction in a sliding part, and excellent stability as well as excellent compatibility with the refrigerant.

BEST MODE FOR CARRYING OUT THE INVENTION

The lubricating oil composition for a refrigerator of the present invention uses a refrigerant including at least one kind of fluorine-containing organic compounds selected from compounds represented by the following molecular formula (A) or including a combination of the fluorine-containing organic compound and a saturated fluorinated hydrocarbon compound,

$$C_pO_qF_rR_s \qquad (A)$$

where: R represents Cl, Br, I, or H; p represents an integer of 1 to 6, q represents an integer of 0 to 2, r represents an integer of 1 to 14, and s represents an integer of 0 to 13; and provided that, when q represents 0, p represents an integer of 2 to 6 and one or more carbon-carbon unsaturated bonds are included in molecules.

<Refrigerant>

The molecular formula (A) represents the kind and the number of the elements in the molecules. The formula (A) represents the fluorine-containing organic compound in which p as the number of the carbon atoms C represents 1 to 6. As long as the fluorine-containing organic compound is a fluorine-containing organic compound having 1 to 6 carbon atoms, the fluorine-containing organic compound can have physical and chemical properties required for the refrigerant, such as a boiling point, a congealing point, and an evaporative latent heat.

In the molecular formula (A), a binding form of p carbon atoms represented by $C_p$ includes a carbon-carbon single bond, an unsaturated bond such as a carbon-carbon double bond, a carbon-oxygen double bond, and the like. The carbon-carbon unsaturated bond is preferably a carbon-carbon double bond from the viewpoint of stability. The number of the carbon-carbon double bond is 1 or more or preferably 1.

In addition, in the molecular formula (A), a binding form of q oxygen atoms represented by $O_q$ is preferably the oxygen parts of an ether group hydroxyl group or carbonyl group. The number of the oxygen atoms q may be 2, and the case where the compound has two ether groups, hydroxyl groups, or the like is also included.

In addition, in the case where q represents 0 in $O_q$ and no oxygen atom is included in the molecules, p represents 2 to 6, and the molecules have one or more unsaturated bonds such as a carbon-carbon double bond. That is, at least one of binding forms of p carbon atoms represented by $C_p$ needs to be a carbon-carbon unsaturated bond.

In addition, in the molecular formula (A), R represents Cl, Br, I, or H, and may represent any one of them. R preferably represents H because of its less possibility of destroying an ozone layer.

As described above, as the fluorine-containing organic compound represented by the molecular formula (A), a fluorinated ether compound, a fluorinated alcohol compound, a fluorinated ketone compound, an unsaturated hydrocarbon compound, and the like are suitably exemplified.

Hereinafter, those compounds are described.

[Fluorinated Ether Compound]

In the present invention, as the fluorinated ether compound used as a refrigerant for a refrigerator, there are exemplified fluorinated ether compounds where, in the molecular formula (A), R represents H, and p represents an integer of 2 to 6, q represents an integer of 1 to 2, r represents an integer of 1 to 14, and s represents an integer of 0 to 13.

Examples of preferred fluorinated ether compound include: a fluorinated compound of a chain aliphatic ether having 2 to 6 carbon atoms, 1 or 2 ether bonds, and a straight-chain or branched alkyl group; and a fluorinated compound of a cyclic aliphatic ether having 3 to 6 carbon atoms and 1 to 2 ether bonds.

Specific examples thereof include dimethyl ethers having 1 to 6 fluorine atoms introduced, methyl ethyl ethers having 1 to 8 fluorine atoms introduced, dimethoxymethanes having 1 to 8 fluorine atoms introduced, methylpropyl ethers having 1 to 10 fluorine atoms introduced, methylbutyl ethers having 1 to 12 fluorine atoms introduced, ethylpropyl ethers having 1 to 12 fluorine atoms introduced, oxetanes having 1 to 6 fluorine atoms introduced, 1,3-dioxoranes having 1 to 6 fluorine atoms introduced, and tetrahydrofurans having 1 to 8 fluorine atoms introduced.

Examples of those fluorinated ether compounds include hexafluorodimethyl ether, pentafluorodimethyl ether, bis(difluoromethyl)ether, fluoromethyl trifluoromethyl ether, trifluoromethyl methyl ether, perfluorodimethoxy methane, 1-trifluoromethoxy-1,1,2,2-tetrafluoroethane, difluoromethoxy pentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolane, various isomers of pentafluorooxetane, and various isomers of tetrafluorooxetane.

In the present invention, one kind of the fluorinated ether compounds may be used alone or two or more kinds thereof may be used in combination.

[Fluorinated Alcohol Compound]

In the present invention, as the fluorinated alcohol compound used as a refrigerant for a refrigerator and represented by the general formula (A), there are exemplified fluorinated ether compounds where, in the molecular formula (A), R represents H, p represents 1 to 6, q represents 0 to 2, r represents 1 to 13, and represents 1 to 13.

Examples of preferred fluorinated alcohol compound include a fluorinated compound of a straight-chain or branched aliphatic alcohols each having 1 to 6 carbon atoms and 1 or 2 hydroxyl groups.

Specific examples thereof include methyl alcohols having 1 to 3 fluorine atoms introduced, ethyl alcohols having 1 to 5 fluorine atoms introduced, propyl alcohols having 1 to 7 fluorine atoms introduced, butyl alcohols having 1 to 9 fluorine atoms introduced, pentyl alcohols having 1 to 11 fluorine atoms introduced, ethylene glycols having 1 to 4 fluorine atoms introduced, and propylene glycols having 1 to 6 fluorine atoms introduced.

Examples of those fluorinated alcohol compounds include monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, various isomers of octafluorobutyl alcohol, nonafluorobutyl alcohol, various isomers of difluoroethylene glycol, trifluoroethylene glycol, tetrafluoroethylene glycol, and various isomers of difluoropropylene glycol, various isomers of trifluoropropylene glycol, various isomers of tetrafluoropropylene glycol, various isomers of pentafluoropropylene glycol, a fluorinated propylene glycol such as hexafluoropropylene glycol, and a fluorinated trimethylene glycol corresponding to the fluorinated propylene glycol.

In the present invention, one kind of the fluorinated alcohol compounds may be used alone or two or more kinds thereof may be used in combination.

[Fluorinated Ketone Compound]

In the present invention, as the fluorinated ketone compound used as a refrigerant for a refrigerator, there are exemplified fluorinated ketone compounds in which, in the molecular formula (A), R represents H, and p represent 2 to 6, q represents 1 to 2, r represents 1 to 12, and s represents 0 to 11.

Examples of preferred fluorinated ketone compounds include fluorinated compounds of aliphatic ketones each having 3 to 6 carbon atoms and a straight-chain or branched alkyl group.

Specific examples thereof include acetones having 1 to 6 fluorine atoms introduced, methyl ethyl ketones having 1 to 8 fluorine atoms introduced, diethyl ketones having 1 to 10 fluorine atoms introduced, and methyl propyl ketones having 1 to 10 fluorine atoms introduced.

Examples of those fluorinated ketone compounds include hexa fluorodimethyl ketone, pentafluorodimethyl ketone, bis (difluoromethyl)ketone, fluoromethyl trifluoromethyl ketone, trifluoromethyl methyl ketone, perfluoromethyl ethyl ketone, trifluoromethyl-1,1,2,2-tetrafluoroethyl ketone, difluoromethyl pentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, and difluoromethyl-2,2,2-trifluoroethyl ketone.

In the present invention, one kind of the fluorinated ketone compounds may be used alone or two or more kinds thereof may be used in combination.

[Unsaturated Fluorinated Hydrocarbon Compound]

In the present invention, as the unsaturated fluorinated hydrocarbon compound used as a refrigerant for a refrigerator, there are exemplified unsaturated fluorinated hydrocarbon compounds where, in the molecular formula (A), R represents H, and p represents 2 to 6, q represents 0, r represents 1 to 12, and s represents 0 to 11.

Examples of preferred unsaturated fluorinated hydrocarbon compounds include a fluorinated compound of a straight-chain or branched chain olefin having 2 to 6 carbon atoms and a fluorinated compound of a cyclic olefin having 4 to 6 carbon atoms.

Specific examples thereof include ethylene having 1 to 3 fluorine atoms introduced, propene having 1 to 5 fluorine atoms introduced, butenes having 1 to 7 fluorine atoms introduced, pentenes having 1 to 9 fluorine atoms introduced, hexenes having 1 to 11 fluorine atoms introduced, cyclobutene having 1 to 5 fluorine atoms introduced, cyclopentene having 1 to 7 fluorine atoms introduced, and cyclohexene having 1 to 9 fluorine atoms introduced.

Of those unsaturated fluorinated hydrocarbon compounds, a fluorinated compound of propene is preferable and for example, various kinds of isomers of pentafluoropropene, 3,3,3-trifluoropropene, and 1,3,3,3-tetrafluoropropene are suitable.

In the present invention, one kind of the unsaturated fluorinated hydrocarbon compounds may be used alone or two or more kinds thereof may be used in combination.

[Saturated Fluorinated Hydrocarbon Compound]

The saturated fluorinated hydrocarbon compound is a refrigerant that can be mixed, as required, in at least one kind of the fluorine-containing organic compounds selected from the compounds represented by the general formula (A).

As the saturated fluorinated hydrocarbon compound, a fluorinated compound of alkane having 2 to 4 carbon atoms is preferable and fluorinated compounds of ethane such as 1,1-difluoroethane, 1,1,1-trifluoroethane, 1,1,2-trifluoroethane, 1,1,1,2-tetrafluoroethane, 1,1,2,2-tetrafluoroethane, and 1,1,1,2,2-pentafluoroethane are particularly suitable. One kind of the saturated fluorinated hydrocarbon compounds may be used alone or two or more kinds thereof may be used in combination.

In addition, the blending amount of the saturated fluorinated hydrocarbon compound is typically 30 mass % or less, preferably 20 mass % or less, and more preferably 10 mass % or less based on the total amount of the refrigerant.

The present invention also provides a lubricating oil composition for a refrigerator, which uses a refrigerant including at least one kind of a fluorine-containing organic compound selected from the fluorinated ether compounds, fluorinated alcohol compounds, and fluorinated ketone compounds, or including a combination of the fluorine-containing organic compound and the saturated fluorinated hydrocarbon compound.

The lubricating oil composition for a refrigerator of the present invention (hereinafter may be referred to as refrigerator oil composition) is a lubricating oil composition for a refrigerator which uses the refrigerant and has a feature of using as a base oil including, as a main component, at least one kind of oxygen-containing compounds selected from polyoxyalkylene glycols, polyvinyl ethers, copolymers of poly(oxy)alkylene glycols or monoethers thereof and polyvinyl ethers, polyesters, and polycarbonates.

<Base Oil>

[Polyoxyalkylene Glycols]

Examples of the polyoxyalkylene glycols which can be used as the base oil in the refrigerator oil composition of the present invention include compounds each represented by the following general formula (I):

$$R^1-[(OR^2)_m-OR^3]_n \quad (I)$$

where $R^1$ represents a hydrogen atom, an alkyl group having 1 to 10 carbon atoms, an acyl group having 2 to 10 carbon atoms, or an aliphatic hydrocarbon group having 1 to 10 carbon atoms and 2 to 6 bonding sites, $R^2$ represents an alkylene group having 2 to 4 carbon atoms, $R^3$ represents a hydrogen atom, an alkyl group having 1 to 10 carbon atoms, or an acyl group having 2 to 10 carbon atoms, n represents an integer of 1 to 6, and m represents such a number that an average value for m×n is 6 to 80.

In the general formula (I), an alkyl group represented by $R^1$ or $R^3$ may be straight-chain, branched, or cyclic. Specific examples of the alkyl group include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, and a cyclohexyl group. When the alkyl group has more than 10 carbon atoms, compatibility with the refrigerant reduces, so the phase separation of the compound and the refrigerant may occur. The alkyl group has preferably 1 to 6 carbon atoms.

In addition, an alkyl group portion of the acyl group represented by $R^1$ or $R^3$ may be straight-chain, branched, or cyclic. Specific examples of the alkyl group portion of the acyl group include various groups each having 1 to 9 carbon atoms described as specific examples of the above alkyl group. When the acyl group has more than 10 carbon atoms, compatibility with the refrigerant reduces, so the phase separation of the compound and the refrigerant may occur. The acyl group has preferably 2 to 6 carbon atoms.

When $R^1$ and $R^3$ each represent an alkyl group or an acyl group, $R^1$ and $R^3$ may be identical to or different from each other.

Further, when n represents 2 or more, multiple $R^3$'s in one molecule may be identical to or different from each other.

When $R^1$ represents an aliphatic hydrocarbon group having 1 to 10 carbon atoms and 2 to 6 bonding sites, the aliphatic hydrocarbon group may be straight-chain or cyclic. Examples of the aliphatic hydrocarbon group having 2 bonding sites include an ethylene group, a propylene group, a butylene group, a pentylene group, a hexylene group, a heptylene group, an octylene group, a nonylene group, a decylene group, a cyclopentylene group, and a cyclohexylene group. In addition, examples of the aliphatic hydrocarbon group having 3 to 6 bonding sites include residues each obtained by removing a hydroxyl group from a polyhydric alcohol such as trimethylolpropane, glycerin, pentaerythritol, sorbitol, 1,2,3-trihydroxycyclohexane, or 1,3,5-trihydroxycyclohexane.

When the aliphatic hydrocarbon group has more than 10 carbon atoms, compatibility with the refrigerant reduces, so the phase separation of the compound and the refrigerant may occur. The aliphatic hydrocarbon group has preferably 2 to 6 carbon atoms.

$R^2$ in the general formula (I) represents an alkylene group having 2 to 4 carbon atoms, and an oxyalkylene group as a repeating unit is, for example, an oxyethylene group, an oxypropylene group, or an oxybutylene group. Oxyalkylene groups in one molecule of the compound may be identical to each other, or may be composed of two or more kinds of oxyalkylene groups; a compound containing at least an oxypropylene unit in any one of its molecules is preferable, and, in particular, a compound containing 50 mol % or more oxypropylene units in the oxyalkylene units is suitable.

n in the general formula (I) represents an integer of 1 to 6, and is determined in accordance with the number of bonding sites of $R^1$. For example, when $R^1$ represents an alkyl group or an acyl group, n represents 1, and when $R^1$ represents an aliphatic hydrocarbon group having 2, 3, 4, 5, or 6 bonding site, n represents 2, 3, 4, 5, or 6, respectively. In addition, m represents such a number that an average value for m×n is 6 to 80. When the average value for m×n deviates from the range, the object of the present invention cannot be sufficiently achieved.

The polyoxyalkylene glycols represented by the general formula (I) includes a polyoxyalkylene glycol having a hydroxyl group at any one of its terminals, and can be suitably used even when the compound contains the hydroxyl group as long as the content of the hydroxyl group is 50 mol % or less with respect to all terminal groups. A content of the hydroxyl group in excess of 50 mol % is not preferable because the moisture-absorbing property of the compound increases, and the viscosity index of the compound reduces.

As those polyoxyalkylene glycols, polyoxypropylene glycol dimethyl ether represented by the following general formula,

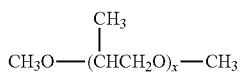

[Chem 1]

where x represents a number of 6 to 80, polyoxyethylene polyoxypropylene glycol dimethyl ether represented by the following general formula,

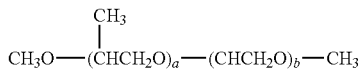

[Chem 2]

where a and b each represent 1 or more and a number so that a total of a and b is 6 to 80, polyoxypropylene glycol monobutyl ether represented by the following general formula,

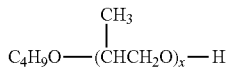

[Chem 3]

where x represents a number of 6 to 80, and polyoxypropylene glycol diacetate are suitable from the viewpoints of economical efficiency and effects.

It should be noted that any one of those detailed in JP 02-305893 A can be used as the polyoxyalkylene glycols represented by the above general formula (I).

In the present invention, one kind of those polyoxyalkylene glycols may be used alone, or two or more kinds thereof may be used in combination.

[Polyvinyl Ethers]

In the refrigerator oil composition of the present invention, the polyvinyl ethers that can be used as base oils are each a compound including, as a main component, a polyvinyl-based compound having a constitutional unit represented by the following general formula (II).

[Chem 4]

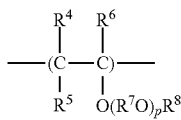

(II)

In the general formula (II), $R^4$, $R^5$, and $R^6$ each represent a hydrogen atom or a hydrocarbon group having 1 to 8 carbon atoms and may be identical to or different from one another.

The hydrocarbon group herein specifically refers to: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methyl cyclohexyl groups, various ethyl cyclohexyl groups, and various dimethyl cyclohexyl groups; aryl groups such as a phenyl group, various methyl phenyl groups, various ethyl phenyl groups, and various dimethyl phenyl groups; and aryl alkyl groups such as a benzyl group, various phenyl ethyl groups, and various methyl benzyl groups. It should be noted that those $R^4$, $R^5$, and $R^6$ each particularly preferably represent a hydrogen atom or a hydrocarbon group having 3 or less carbon atoms.

On the other hand, $R^7$ in the general formula (II) represent a divalent hydrocarbon group having 2 to 10 carbon atoms. Specific examples of the divalent hydrocarbon group having 2 to 10 carbon atoms herein include: a divalent aliphatic group such as an ethylene group, a phenyl ethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups; alicyclic groups in which alicyclic hydrocarbon has two bonding sites, such as cyclohexane, methylcyclohexane, ethylcyclohexane, dimethylcyclohexane, and propylcyclohexane; divalent aromatic hydrocarbon groups such as various phenylene groups, various methylphenylene groups, various ethylphenylene groups, various dimethylphenylene groups, and various naphthylenes; alkyl aromatic groups having monovalent bonding sites in each of the alkyl group portion and the aromatic portion of the alkyl aromatic hydrocarbon, such as toluene, xylene, and ethyl benzene; and alkyl aromatic groups each having a bonding site in the alkyl group portion of a polyalkyl aromatic hydrocarbon such as xylene and diethyl benzene. Of those, aliphatic groups having 2 to 4 carbon atoms are particularly preferable. In addition, multiple $R^7O$'s are identical to or different from one another.

It should be noted that p in the general formula (II) represents the number of the repeating and such a number that average value thereof is in the range of 0 to 10 or preferably 0 to 5.

In addition, $R^8$ in the general formula (II) represents a hydrocarbon group having 1 to 10 carbon atoms. The hydrocarbon group herein specifically refers to: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methyl cyclohexyl groups, various ethyl cyclohexyl groups, various propyl cyclohexyl groups, and various dimethyl cyclohexyl groups; aryl groups such as a phenyl group, various methyl phenyl groups, various ethyl phenyl groups, various dimethyl phenyl groups, various propyl phenyl groups, various trimethyl phenyl groups, various butyl phenyl groups, and various naphthyl groups; and aryl alkyl groups such as a benzyl group, various phenyl ethyl groups, various methyl benzyl groups, various phenyl propyl groups, and various phenyl butyl groups. Of those, a hydrocarbon group having 8 or less carbon atoms is preferable. When p represents 0, an alkyl group having 1 to 6 carbon atoms is preferable, and when p represents 1 or more, an alkyl group having 1 to 4 carbon atoms is particularly preferable.

The polyvinyl ether-based compound in the present invention has a constitutional unit represented by the general formula (II). The number of the repeating thereof (that is, polymerization degree) may be appropriately selected according to a desired kinematic viscosity and is typically 2 to 50 mm²/s (100° C.) or preferably 3 to 90 mm²/s (100° C.).

The polyvinyl ether-based compound in the present invention can be produced by polymerization of the corresponding vinyl ether-based monomer. The vinyl ether-based monomer that can be used herein is represented by the following general formula (III),

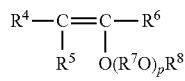

(III)

where $R^4$, $R^5$, $R^6$, $R^7$, and $R^8$, and p each have the same meaning as that described above. As the vinyl ether-based monomer, there are various compounds corresponding to the polyvinyl ether-based compound. Examples thereof include: vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl-ether, vinyl-2-methoxy-propylether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, and vinyl-2,6,9-trioxa-4-decyl ether; 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene. Those vinyl ether-based monomers can be produced by any known methods.

The terminals of the polyvinyl ether-based compound having the constitutional unit represented by the general formula (II) used as a main component of the refrigerator oil composition of the present invention can be converted to a desired structure by a method in this application and a known method. As a converted group, a saturated hydrocarbon, an ether, an alcohol, a ketone, an amide, and a nitrile are exemplified.

As the polyvinyl ether-based compound used in the base oil in the refrigerator oil composition of the present invention, a compound having the following terminal structure is suitable.

That is, the polyvinyl ether-based compound has:
(1) a structure in which one of the terminals is represented by the following general formula (IV),

[Chem 6]

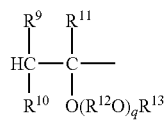

(IV)

where $R^9$, $R^{10}$, and $R^{11}$ each represent a hydrogen atom, or a hydrocarbon group having 1 to 8 carbon atoms and may be identical to or different from one another, $R^{12}$ represents a divalent hydrocarbon group having 2 to 10 carbon atoms, $R^{13}$ represents a hydrocarbon group having 1 to 10 carbon atoms, q represents such a number that an average value thereof is 0 to 10, and in the case where multiple $R^{12}O$'s are present, multiple $R^{12}O$'s may be identical to or different from one another, and the other terminal is represented by the following general formula (V),

[Chem 7]

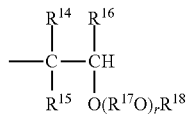

(V)

where $R^{14}$, $R^{15}$, and $R^{16}$ each represent a hydrogen atom, or a hydrocarbon group having 1 to 8 carbon atoms and may be identical to or different from one another, $R^{17}$ represents a divalent hydrocarbon group having 2 to 10 carbon atoms, $R^{18}$ represents a hydrocarbon group having 1 to 10 carbon atoms, r represents such a number that an average value thereof is 0 to 10, and when multiple $R^{17}O$'s are present, multiple $R^{17}O$'s may be identical to or different from one another;

(2) a structure in which one of the terminals is represented by the general formula (IV) and the other terminal is represented by the following general formula (VI),

[Chem 8]

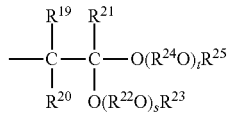

(VI)

where $R^{19}$, $R^{20}$, and $R^{21}$ each represent a hydrogen atom, or a hydrocarbon group having 1 to 8 carbon atoms and may be identical to or different from one another, $R^{22}$ and $R^{24}$ each represent a divalent hydrocarbon group having 2 to 10 carbon atoms and may be identical to or different from each other, $R^{23}$ and $R^{25}$ each represent a hydrocarbon group having 1 to 10 carbon atoms and may be identical to or different from each other, s and t each represent such a number that an average value thereof is 0 to 10 and my be identical to or different from each other, when multiple $R^{22}O$'s are present, multiple $R^{22}O$'s may be identical to or different from one another, and when multiple $R^{24}O$'s are present, multiple $R^{24}O$'s may be identical to or different from one another;

(3) a structure in which one of the terminals is represented by the general formula (IV) and the other terminal is an olefinic, unsaturated bond; or (4) a structure in which one of the terminals is represented by the general formula (IV) and the other terminal is represented by the following general formula (VII),

[Chem 9]

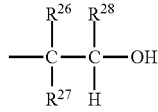

(VII)

where $R^{26}$, $R^{27}$, and $R^{28}$ each represent a hydrogen atom, or a hydrocarbon group having 1 to B carbon atoms and may be identical to or different from one another.

The polyvinyl ether-based mixture may be a mixture including two or more kinds of the polyvinyl ether-based compounds selected from those having the terminal structures in the items (1) to (4). As the mixture, for example, a mixture of the compounds in the items (1) and (4) and a mixture of the compounds in the items (2) and (3) are preferably exemplified.

Because the kinematic viscosity of the refrigerator oil composition before being mixed in the refrigerant is preferably 2 to 50 mm²/s at 100° C., it is preferable to select the raw material, the initiator, and the reaction condition in such a manner to produce a polyvinyl ether-based compound having the viscosity in the range as the polyvinyl ether-based compound. In addition, the number average molecular weight of the polymer is typically 500 or more or preferably 600 to 3,000. It should be noted that even the polymer having the kinematic viscosity out of the above range can be adjusted to have the kinematic viscosity in the range by mixing with a polymer having another kinematic viscosity.

In the present invention, one kind of the polyvinyl ether-based compounds may be used alone or two or more kinds thereof may be used in combination.

[Copolymer of Poly(oxy)alkylene Glycol or Monoether Thereof and Polyvinyl Ether]

It should be noted that the poly(oxy)alkylene glycol refers to both polyalkylene glycol and polyoxyalkylene glycol.

In the refrigerator oil composition of the present invention, as a copolymer of poly(oxy)alkylene glycol or a monoether thereof and polyvinyl ether that can be used as a base oil, copolymers represented by the following general formula (VIII) and the following general formula (IX) (hereinafter, referred to as polyvinyl ether-based copolymer I and polyvinyl ether-based copolymer II, respectively) are exemplified.

[Chem 10]

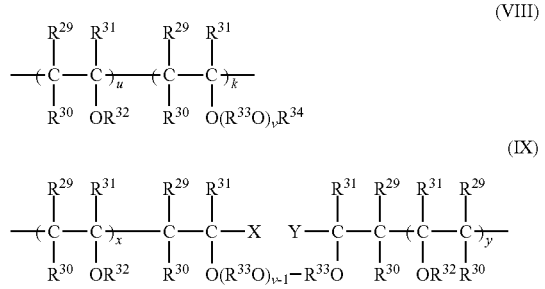

In the general formula (VIII), $R^{29}$, $R^{30}$, and $R^{31}$ each represent a hydrogen atom, or a hydrocarbon group having 1 to 8 carbon atoms and may be identical to or different from one another, $R^{33}$ represents a divalent hydrocarbon group having 2 to 4 carbon atoms, $R^{34}$ represents an aliphatic or alicyclic hydrocarbon group having 1 to 20 carbon atoms, an aromatic group that may have a substituent having 1 to 20 carbon atoms, an acyl group having 2 to 20 carbon atoms, or an oxygen-containing hydrocarbon group having 2 to 50 carbon atoms, $R^{32}$ represents a hydrocarbon group having 1 to 10 carbon atoms, and when multiple $R^{34}$'s, $R^{33}$'s, and $R^{32}$'s are present, multiple $R^{34}$'s, $R^{33}$'s, and $R^{32}$'s may be identical to or different from one another.

Here, specific examples of the hydrocarbon group having 1 to 8 carbon atoms represented by any one of $R^{29}$ to $R^{31}$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; aryl groups such as a cyclopentyl group, a cyclohexyl group, various methyl cyclohexyl groups, various ethyl cyclohexyl groups, various dimethyl cyclohexyl groups, and various dimethyl phenyl groups; and aryl alkyl groups such as a benzyl group, various phenyl ethyl groups, and various methyl benzyl groups. It should be noted that $R^{29}$, $R^{30}$, and $R^{31}$ each particularly preferably represent a hydrogen atom.

On the other hand, specific examples of the divalent hydrocarbon group having 2 to 4 carbon atoms represented by $R^{33}$ include divalent alkylene groups such as a methylene group, an ethylene group, a propylene group, a trimethylene group, and various butylene groups.

It should be noted that v in the general formula (VIII) represents the number of the repeating of $R^{33}$O and represents such a number that an average value thereof is in the range of 1 to 50, preferably 1 to 20, more preferably 1 to 10, or particularly preferably 1 to 5. When multiple $R^{33}$O's are present, multiple $R^{33}$O's are identical to or different from one another.

In addition, k represents a number of 1 to 50, preferably 1 to 10, more preferably 1 to 2, or particularly preferably 1, and u represents a number of 0 to 50, preferably 2 to 25, and more preferably 5 to 15. When multiple k's and u's are present, the polymer may be a block polymer or a random polymer.

Further, $R^{34}$ in the general formula (VIII) preferably represents an alkyl group having 1 to 10 carbon atoms, an acyl group having 2 to 10 carbon atoms, or an oxygen-containing hydrocarbon group having 2 to 50 carbon atoms.

Specific examples of the alkyl group having 1 to 10 carbon atoms include a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methyl cyclohexyl groups, various ethyl cyclohexyl groups, various propyl cyclohexyl groups, and various dimethyl cyclohexyl groups.

In addition, as the acyl group having 2 to 10 carbon atoms, an acetyl group, a propionyl group, a butyryl group, an isobutyryl group, a valeryl group, an isovaleryl group, a pivaloyl group, a benzoyl group, and a toluoyl group are exemplified.

Further, specific examples of the oxygen-containing hydrocarbon group having 2 to 50 carbon atoms preferably include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, and a (1-methyl-2-methoxy)propyl group.

In the general formula (VIII), specific examples of the hydrocarbon group having 1 to 10 carbon atoms represented by $R^{32}$ include: alkyl groups such as a methyl group, an ethyl group, an n-propyl group, an isopropyl group, an n-butyl group, an isobutyl group, various pentyl groups, various hexyl groups, various heptyl groups, various octyl groups, various nonyl groups, and various decyl groups; cycloalkyl groups such as a cyclopentyl group, a cyclohexyl group, various methyl cyclohexyl groups, various ethyl cyclohexyl groups, various propyl cyclohexyl groups, and various dimethyl cyclohexyl groups; aryl groups such as a phenyl group, various methyl phenyl groups, various ethyl phenyl groups, various dimethyl phenyl groups, various propyl phenyl groups, various trimethyl phenyl groups, various butyl phenyl groups, and various naphthyl groups; and aryl alkyl groups such as a benzyl group, various phenyl ethyl groups, various methyl benzyl groups, various phenyl propyl groups, and various phenyl butyl groups.

It should be noted that $R^{29}$ to $R^{31}$, $R^{34}$, $R^{33}$, and v, and $R^{29}$ to $R^{32}$ may be identical to or different from one another among constitutional units.

The polyvinyl ether-based copolymer I having the constitutional unit represented by the general formula (VIII) has an effect of improving the lubricity, insulating property, and moisture-absorbing property while satisfying the compatibility because the polyvinyl ether-based copolymer I is a copolymer. In this case, those properties of the lubricant can be adjusted to the intended level by selecting the kind of the monomer as a raw material, the kind of the initiator, and the rate in the copolymer. Therefore, the polyvinyl ether-based copolymer I has an effect that a lubricant depending on requirements of the type of a compressor in a refrigerating system or a conditioner system, and the lubricity, the compatibility, and the like, which are different according to the material of a lubricating part, refrigerating capacity, the kind of the refrigerant, and the like, can be obtained freely.

On the other hand, in the polyvinyl ether-based copolymer II represented by the general formula (IX), $R^{29}$ to $R^{32}$, $R^{33}$, and v each have the same meaning as that described above. When multiple $R^{33}$'s and $R^{32}$'s are present, each of $R^{33}$'s and $R^{32}$'s may be identical to or different from one another. x and y each represent a number of 1 to 50. When multiple x's and y's are present, the polymer may be a block polymer or a random polymer. X and Y each independently represent a hydrogen atom, a hydroxyl group, or a hydrocarbon group having 1 to 20 carbon atoms.

A production method for the polyvinyl ether-based copolymer I represented by the general formula (VIII) is not particularly limited as long as the polyvinyl ether-based copolymer I can be obtained. For example, the polyvinyl ether-based copolymer I can be produced by the following production methods 1 to 3.

(Production Method 1 for Polyvinyl Ether-Based Copolymer I)

In the production method 1, a poly(oxy) alkylene glycol compound represented by the following general formula (X),

where $R^{33}$ and $R^{34}$, and v each have the same meaning as that described above, is used as an initiator, and a vinyl ether-based compound represented by the following general formula (XI),

where $R^{29}$ to $R^{32}$ each have the same meaning as that described above, is polymerized, whereby the polyvinyl ether-based copolymer I can be obtained.

Examples of poly(oxy)alkylene glycol compound represented by the general formula (X) include (oxy)alkylene glycol monoethers such as ethylene glycol monomethylether, diethylene glycol monomethylether, triethylene glycol monomethylether, propylene glycol monomethylether, dipropylene glycol monomethylether, and tripropylene glycol monomethylether.

Examples of the vinyl ether-based compounds represented by the general formula (XI) include: vinyl ethers such as vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, and vinyl-n-hexyl ether; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, and 2-tert-butoxy-2-butene. Those vinyl ether-based monomers can be produced by any known methods.

(Production Method 2 for Polyvinyl Ether-Based Copolymer I)

In the production method 2, an acetal compound represented by the following general formula (XII),

[Chem 12]

where $R^{29}$ to $R^{34}$, and v each have the same meaning as that described above, is used as an initiator, and the vinyl ether-based compound represented by the general formula (XI) is polymerized, whereby the polyvinyl ether-based copolymer I can be obtained.

Examples of the acetal compound represented by the general formula (XII) include acetaldehyde methyl(2-methoxyethyl)acetal, acetaldehyde ethyl(2-methoxyethyl)acetal, acetaldehyde methyl(2-methoxy-1-methylethyl)acetal, acetaldehyde ethyl(2-methoxy-1-methylethyl)acetal, acetaldehyde methyl[2-(2-methoxyethoxy)ethyl]acetal, acetaldehyde ethyl[2-(2-methoxyethoxy)ethyl]acetal, acetaldehyde methyl[2-(2-methoxyethoxy)-1-methylethyl]acetal, and acetaldehyde ethyl[2-(2-methoxyethoxy)-1-methylethyl]acetal.

In addition, the acetal compound represented by the general formula (XII) can be produced by reacting one molecule of the poly(oxy)alkylene glycol compound represented by the general formula (X) with one molecule of the vinyl ether-based compound represented by the general formula (XI). The obtained acetal compound is used as an initiator after being isolated or as it is.

(Production Method 3 for Polyvinyl Ether-Based Copolymer I)

In the production method 3, an acetal compound represented by the following general formula (XIII),

[Chem 13]

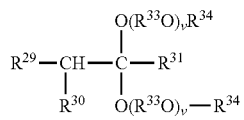
(XIII)

where $R^{29}$ to $R^{31}$, $R^{33}$, $R^{34}$ and v each have the same meaning as that described above, is used as an initiator, and the vinyl ether-based compound represented by the general formula (XI) is polymerized, whereby the polyvinyl ether-based copolymer I can be obtained.

Examples of the acetal compound represented by the general formula (XIII) include acetaldehyde di(2-methoxyethyl)acetal, acetaldehyde di(2-methoxy-1-methylethyl)acetal, acetaldehyde di[2-(2-methoxyethoxy)ethyl]acetal, and acetaldehyde di[2-(2-methoxyethoxy)-1-methylethyl]acetal.

In addition, the acetal compound represented by the general formula (XIII) can be produced by reacting one molecule of the poly(oxy)alkylene glycol compound represented by the general formula (X) with one molecule of a vinyl ether-based compound represented by the following general formula (XIV),

[Chem 14]

$$R^{29}-C=C-R^{31}$$
$$\phantom{R^{29}-C}|\phantom{=C}|$$
$$\phantom{R^{29}-}R^{30}\ O(R^{33}O)_vR^{34}$$

(XIV)

where $R^{29}$ to $R^{31}$, $R^{33}$, $R^{34}$, and v each have the same meaning as that described above. The obtained acetal compound may be used as an initiator after being isolated or as it is.

The vinyl ether-based copolymer I represented by the general formula (VIII) is a vinyl ether-based copolymer I having a structure in which one of the terminals is represented by the following formula (XV) or (XVI),

[Chem 15]

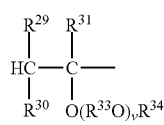
(XV)

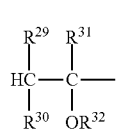
(XVI)

where $R^{29}$ to $R^{34}$, and v each have the same meaning as that described above, and the other terminal is represented by the following general formula (XVII) or the following general formula (XVIII),

[Chem 16]

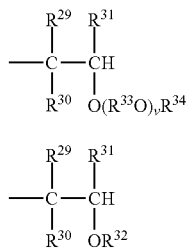
(XVII)

(XVIII)

where $R^{29}$ to $R^{34}$, and v each have the same meaning as that described above.

Of those polyvinyl ether-based copolymers 1, the following are particularly suitable for the base oil in the refrigerator oil composition of the present invention:

(1) a substance having a structure in which one of the terminal is represented by the general formula (XV) or (XVI), and the other terminal is represented by the general formula (XVII) or (XVIII), and in the general formula (VIII), all $R^{29}$, $R^{30}$, and $R^{31}$ represent hydrogen atoms, v represents a number of 1 to 4, $R^{33}$ represents a divalent hydrocarbon group having 2 to 4 carbon atoms, $R^{34}$ represents an alkyl group having 1 to 10 carbon atoms, and $R^{32}$ represents a hydrocarbon group having 1 to 10 carbon atoms;

(2) a substance having a structure in which one of the terminal is represented by the general formula (XV), and the other terminal is represented by the general formula (XVIII), and in the general formula (VIII), all $R^{29}$, $R^{30}$, and $R^{31}$ represent hydrogen atoms, v represents a number of 1 to 4, $R^{33}$ represents a divalent hydrocarbon group having 2 to 4 carbon atoms, $R^{34}$ represents an alkyl group having 1 to 10 carbon atoms, and $R^{32}$ represents a hydrocarbon group having 1 to 10 carbon atoms; and (3) a substance having a structure in which one of the terminal is represented by the general formula (XVI), and the other terminal is represented by the general formula (XVII), and in the general formula (VIII), all $R^{29}$, $R^{30}$, and $R^{31}$ represent hydrogen atoms, v represents a number of 1 to 4, $R^{33}$ represents a divalent hydrocarbon group having 2 to 4 carbon atoms, $R^{34}$ represents an alkyl group having 1 to 10 carbon atoms, and $R^{32}$ represents a hydrocarbon group having 1 to 10 carbon atoms.

On the other hand, a production method for the polyvinyl ether-based copolymer II represented by the general formula (IX) is not particularly limited as long as the polyvinyl ether-based copolymer II can be obtained, and the polyvinyl ether-based copolymer II can be produced efficiently by the following method.

(Production Method for Polyvinyl Ether-Based Copolymer II)

The polyvinyl ether-based copolymer II represented by the general formula (IX) can be obtained by using poly(oxy)alkylene glycol represented by the following general formula (XIX) as a initiator, $$HO-(R^{33}O)_v-H$$ (XIX)

where $R^{33}$ and v each have the same meaning as that described above, and polymerizing the vinyl ether compound represented by the general formula (XI).

Examples of the poly(oxy)alkylene glycol represented by the general formula (XIX) include ethylene glycol, diethylene glycol, triethylene glycol, polyethylene glycol, propylene glycol, dipropylene glycol, and polypropylene glycol.

In the present invention, one kind of the copolymers of the poly(oxy) alkylene glycols or monoether thereof and polyvinyl ethers may be used or two or more kinds thereof may be used in combination.

[Polyol Esters]

An ester of a diol or a polyol having about 3 to 20 hydroxyl groups and an aliphatic acid having about 1 to 24 carbon atoms is preferably used as the polyol esters to be used as the base oil in the refrigerator oil composition of the present invention. Here, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Examples of the polyol include: polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (composed of 2 to 20 glycerin molecules), 1,3,5-pentanetriol, sorbitol, sorbitan, a sorbitol glycerin condensate, adonitol, arabitol, xylitol, and mannitol; and saccharides such as xylose, arabinose, ribose, rhamnose, glucose, fructose, galactose, mannose, sorbose, cellobiose, maltose, isomaltose, trehalose, sucrose, raffinose, gentianose, and merenditose, and partially etherified products and methyl glucosides of the saccharides. Of those, a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is preferred as a polyol.

The aliphatic acid may have any number of carbon atoms without any particular limitation; an aliphatic acid having 1 to 24 carbon atoms is typically used. Of the aliphatic acids each having 1 to 24 carbon atoms, an aliphatic acid having 3 or more carbon atoms is preferred, an aliphatic acid having 4 or more carbon atoms is more preferred, an aliphatic acid having 5 or more carbon atoms is still more preferred, and an aliphatic acid having 10 or more carbon atoms is most preferred in terms of lubricity. In addition, an aliphatic acid having 18 or less carbon atoms is preferred, an aliphatic acid having 12 or less carbon atoms is more preferred, and an aliphatic acid having 9 or less carbon atoms is still more preferred in terms of compatibility with the refrigerant.

In addition, the aliphatic acid may be a straight-chain aliphatic acid or a branched aliphatic acid; the aliphatic acid is preferably a straight-chain aliphatic acid in terms of lubricity, or is preferably a branched aliphatic acid in terms of hydrolytic stability. Further, the aliphatic acid may be a saturated aliphatic acid or an unsaturated aliphatic acid.

Examples of the aliphatic acid include: straight-chain or branched pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid; or a neoic acid of which the α-carbon atom is quaternary. More specifically, valeric(n-pentanoic) acid, caproic(n-hexanoic) acid, enanthic(n-heptanoic) acid, caprylic(n-ocatanoic) acid, pelargoic(n-nonanoic) acid, capric(n-decanoic) acid, oleic(cis-9-octadecenoic) acid, isopentanoic(3-methylbutanoic) acid, 2-methylhexanoic acid, 2-ethylpentanoic acid, 2-ethylhexanoic acid, and 3,5,5-trimethylhexanoic acid are preferred.

It should be noted that the polyol ester may be a partial ester in which some of the hydroxyl groups of a polyol remain without being esterified, may be a complete ester in which all of the hydroxyl groups of the polyol are esterified, or may be a mixture of a partial ester and a complete ester; the polyol ester is preferably a complete ester.

Of the polyol esters, an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is more preferred, and an ester of neopentyl glycol, trimethylolethane, trimethylolpropane, trimethylolbutane, or pentaerythritol is still more preferred because such ester is additionally excellent in hydrolytic stability. An ester of pentaerythritol is most preferred because the ester is particularly excellent in compatibility with the refrigerant and hydrolytic stability.

Specific examples of the preferred polyol ester include: a diester formed of neopentyl glycol and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol ethane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol propane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol butane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a tetraester formed of pentaerythritol and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid.

It should be noted that the esters with two or more kinds of aliphatic acids may be a mixture of two or more kinds of esters formed of one kind of aliphatic acid and a polyol. An ester formed of two or more kinds of mixed aliphatic acids and a polyol, particularly an ester formed of mixed aliphatic acids and a polyol is excellent in low temperature properties and compatibility with a refrigerant.

[Polycarbonates]

The polycarbonates which can be used as the base oil in the refrigerator oil composition of the present invention is preferably, for example, at least one kind selected from polycarbonates each having two or more carbonate bonds in any one of its molecules, that is: compounds each represented by the following general formula (XX),

[Chem 17]

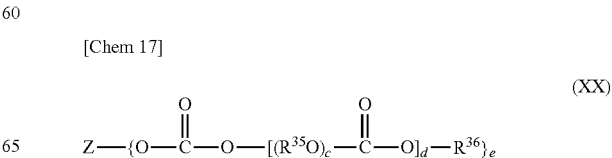

where: Z represents a residue obtained by removing a hydroxyl group from an e-valent alcohol having 1 to 12 carbon atoms; $R^{35}$ represents a straight-chain or branched alkylene group having 2 to 10 carbon atoms; $R^{36}$ represents a monovalent hydrocarbon group having 1 to 12 carbon atoms or a group containing an ether bond represented by $R^{38}(O\text{—}R^{37})_f\text{—}$ where $R^{38}$ represents a hydrogen atom or a monovalent hydrocarbon group having 1 to 12 carbon atoms, $R^{37}$ represents a straight-chain or branched alkylene group having 2 to 10 carbon atoms, and f represents an integer of 1 to 20; c represents an integer of 1 to 30, d represents an integer of 1 to 50; and e represents an integer of 1 to 6; and (ii) compounds each represented by the following general formula (XXI),

[Chem 18]

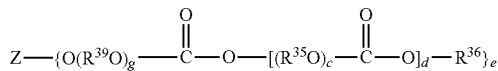

(XXI)

where: $R^{39}$ represents a straight-chain or branched alkylene group having 2 to 10 carbon atoms; g represents an integer of 1 to 20; and Z, $R^{35}$, $R^{36}$, c, d, and e each have the same meaning as that described above.

In each of the general formulae (XX) and (XXI), Z, which represents a residue obtained by removing a hydroxyl group from a monovalent to hexavalent alcohol having 1 to 12 carbon atoms, particularly preferably represents a residue obtained by removing a hydroxyl group from a monovalent alcohol having 1 to 12 carbon atoms.

Examples of monovalent to hexavalent alcohols having 1 to 12 carbon atoms for the residue represented by Z include, as the monovalent alcohols: aliphatic monovalent alcohols such as methyl alcohol, ethyl alcohol, n- or isopropyl alcohol, various butyl alcohols, various pentyl alcohols, various hexyl alcohols, various octyl alcohols, various decyl alcohols, and various dodecyl alcohols; alicyclic monovalent alcohols such as cyclopentyl alcohol and cyclohexyl alcohol; aromatic alcohols such as phenol, cresol, xylenol, butylphenol, and naphthol; and aromatic aliphatic alcohols such as benzyl alcohol and phenethyl alcohol; as the bivalent alcohols: aliphatic alcohols such as ethylene glycol, propylene glycol, butylene glycol, neopentyl glycol, and tetramethylene glycol; alicyclic alcohols such as cyclohexanediol and cyclohexanedimethanol; and aromatic alcohols such as catechol, resorcinol, hydroquinone, and dihydroxy diphenyl; as trivalent alcohols: aliphatic alcohols such as glycerin, trimethylol propane, trimethylol ethane, trimethylol butane, and 1,3,5-pentatriol; alicyclic alcohols such as cyclohexanetriol and cyclohexanetrimethanol; and aromatic alcohols such as pyrogallol and methylpyrogallol; and as tetravalent to hexavalent alcohols, aliphatic alcohols such as pentaerythritol, diglycerin, triglycerin, sorbitol, and dipentaerythritol.

Examples of the polycarbonate compound include compounds each represented by the following general formula (XX-a) as a special form of the general formula (XX),

[Chem 19]

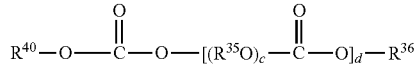

(XX-a)

where $R^{40}$ represents a residue obtained by removing a hydroxyl group from a monovalent alcohol having 1 to 12 carbon atoms, and $R^{35}$, $R^{36}$, c, and d each have the same meaning as that described above, and/or compounds each represented by the following general formula (XXI-a) as a special form of the general formula (XXI),

[Chem 20]

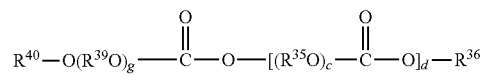

(XXI-a)

where $R^{35}$, $R^{36}$, $R^{39}$, $R^{40}$, c, d, and g each have the same meaning as that described above.

Examples of the residue obtained by removing a hydroxyl group from a monovalent alcohol having 1 to 12 carbon atoms represented by $R^{40}$ in each of the general formulae (XX-a) and (XXI-a) include: aliphatic hydrocarbon groups such as a methyl group, an ethyl group, an n-propyl group, an isopropyl group, various butyl groups, various pentyl groups, various hexyl groups, various octyl groups, various decyl groups, and various dodecyl groups; alicyclic hydrocarbon groups such as a cyclopentyl group, a cyclohexyl group, a methylcyclohexyl group, a dimethylcyclohexyl group, and a decahydronaphthyl group; aromatic hydrocarbon groups such as a phenyl group, various tolyl groups, various xylyl groups, a mesityl group, and various naphthyl groups; and aromatic aliphatic hydrocarbon groups such as a benzyl group, a methylbenzyl group, a phenethyl group, and various naphthylmethyl groups. Of those, a straight-chain or branched alkyl group having 1 to 6 carbon atoms is preferable.

$R^{35}$, which represents a straight-chain or branched alkylene group having 2 to 10 carbon atoms, preferably represents a straight-chain or branched alkylene group having 2 to 6 carbon atoms, or particularly suitably represents an ethylene group or a propylene group in terms of, for example, the performance of the compound and the ease with which the compound is produced. Further, $R^{36}$ represents a monovalent hydrocarbon group having 1 to 12 carbon atoms or a group containing an ether bond represented by $R^{38}(O\text{—}R^{37})_f\text{—}$ where $R^{38}$ represents a hydrogen atom or a monovalent hydrocarbon group having 1 to 12, or preferably 1 to 6 carbon atoms, $R^{37}$ represents a straight-chain or branched alkylene group having 2 to 10 carbon atoms, and f represents an integer of 1 to 20, and examples of the above monovalent hydrocarbon group having 1 to 12 carbon atoms include examples similar to those described in the description of $R^{40}$. In addition, a straight-chain or branched alkylene group having 2 to 10 carbon atoms represented by $R^{37}$ is preferably a straight-chain or branched alkylene group having 2 to 6 carbon atoms, or is particularly preferably an ethylene group or a propylene group by the same reason as that in the case of $R^{35}$.

$R^{36}$ particularly preferably represents a straight-chain or branched alkyl group having 1 to 6 carbon atoms.

A straight-chain or branched alkylene group having 2 to 10 carbon atoms represented by $R^{39}$ in the general formula (XXI-a) is preferably a straight-chain or branched alkylene group having 2 to 6 carbon atoms, or is particularly preferably an ethylene group or a propylene group by the same reason as that in the case of $R^{35}$.

Such a polycarbonate compound can be produced by any one of various methods; a target polycarbonate compound can be typically produced by causing a carbonate-formable derivative such as a carbonic acid diester or phosgene and an alkylene glycol or a polyalkylene glycol to react with each other in accordance with a known method.

In the present invention, one kind of those polycarbonates may be used alone, or two or more kinds thereof may be used in combination.

In the refrigerator oil composition of the present invention, as a base oil, a substance including, as a main component, at least one kind of oxygen-containing compounds selected from the polyoxyalkylene glycols, polyvinyl ethers, copolymers of poly(oxy)alkylene glycols or monoethers thereof and polyvinyl ethers, polyol esters, and polycarbonates is used. Here, the phrase "including as a main component" refers to including the oxygen-containing compound at a rate of 50 mass % or more. The content of the oxygen-containing compound in the base oil is preferably 70 mass % or more, more preferably 90 mass % or more, and still more preferably 100 mass %.

In the present invention, the kinematic viscosity of the base oil at 100° C. is preferably 2 to 50 mm$^2$/s, more preferably 3 to 40 mm$^2$/s, and still more preferably 4 to 30 mm$^2$/s. When the kinematic viscosity is 2 mm$^2$/s or more, favorable lubricity (load capacity resistance) is exhibited and sealing property is good, and when the kinematic viscosity is 50 mm$^2$/s or less, energy saving is also favorable.

In addition, the number average molecular weight of the base oil is preferably 500 or more, more preferably 600 to 3,000, and still more preferably 700 to 2,500. The flashing point of the base oil is preferably 150° C. or higher. When the number average molecular weight of the base oil is 500 or more, desirable performance as the refrigerator oil can be exhibited and the flashing point of the base oil can be set to 150° C. or higher.

In the present invention, when the base oil has the above properties, the refrigerator oil composition may include, in addition to the oxygen-containing compound, another base oil at 50 mass % or less, preferably 30 mass % or less, and more preferably 10 mass % or less, and the refrigerator oil composition free of another base oil is still more preferred.

the base oil that can be used together with the oxygen-containing compound, other polyesters, a hydrogenation product of α-olefin oligomer, a mineral oil, an alicyclic hydrocarbon compound, an alkylated aromatic hydrocarbon compound are exemplified.

At least one kind of an additive selected from an extreme pressure agent, an oiliness agent, an antioxidant, an acid scavenger, and an anti-foaming agent can be incorporated into the refrigerator oil composition of the present invention.

Examples of the extreme pressure agent include phosphorus-based extreme pressure agents such as a phosphate, an acid phosphate, a phosphite, an acid phosphite, and amine salts thereof.

Of those phosphorus-based extreme pressure agents, tricresyl phosphate, trithiophenyl phosphate, tri(nonylphenyl) phosphite, dioleyl hydrogen phosphite, 2-ethylhexyldiphenyl phosphite, or the like is particularly preferable in terms of extreme pressure property, a frictional characteristic, and the like.

In addition, the examples of the extreme pressure agent include metal salts of carboxylic acids. The term "metal salts of carboxylic acids" as used herein preferably refers to metal salts of carboxylic acids each having 3 to 60 carbon atoms, and, further, aliphatic acids each having 3 to 30, in particular, 12 to 30 carbon atoms. The examples further include metal salts of: dimer acids and trimer acids of the aliphatic acids; and dicarboxylic acids each having 3 to 30 carbon atoms. Of those, a metal salt of an aliphatic acid having 12 to 30 carbon atoms or of a dicarboxylic acid having 3 to 30 carbon atoms is particularly preferred.

On the other hand, a metal of which any such metal salt is constituted is preferably an alkali metal or an alkaline earth metal, and, in particular, is optimally an alkali metal.

Further, examples of the extreme pressure agents and extreme pressure agents other than those mentioned above include sulfur type extreme pressure agents such as sulfurized fat, sulfurized aliphatic acid, sulfurized ester, sulfurized olefin, dihydrocarvyl polysulphide, thiocarbamates, thioterpenes, and dialkyl thiodipropionates.

The blending amount of the above extreme pressure agent is in the range of preferably 0.001 to 5 mass % in ordinary cases, or particularly preferably 0.005 to 3 mass % with reference to the total amount of the composition in terms of lubricity and stability.

One kind of the extreme pressure agents may be used alone, or two or more kinds thereof may be used in combination.

Examples of the oiliness agents include, aliphatic saturated and unsaturated monocarboxylic acids such as stearic acid and oleic acid; polymerized aliphatic acids such as dimer acids and hydrogenated dimer acids; hydroxy aliphatic acids such as ricinoleic acid and 12-hydroxystearic acid; aliphatic saturated and unsaturated monohydric alcohols such as lauryl alcohol and oleyl alcohol; aliphatic saturated and unsaturated monoamines such as stearyl amine and oleylamine; aliphatic saturated and unsaturated monocarboxylic acid amides such as lauric acid amide and oleamide; and partial esters of a polyhydric alcohol such as glycerin and sorbitol, and an aliphatic saturated or unsaturated monocarboxylic acid.

One kind of the oiliness agents may be used alone, or two or more kinds thereof may be used in combination. In addition, the blending amount of the oiliness agent is selected from the range of typically 0.01 to 10 mass, or preferably 0.1 to 5 mass % with reference to the total amount of the composition.

A phenol-based antioxidant such as 2,6-di-tert-butyl-4-methylphenol, 2,6-di-tert-butyl-4-ethylphenol, or 2,2'-methylenebis(4-methyl-6-tert-butylphenol) or an amine-based antioxidant such as phenyl-α-naphthylamine or N,N'-di-phenyl-p-phenylenediamine is preferably blended as the antioxidant. The antioxidant is blended in the composition at a content of typically 0.01 to 5 mass %, or preferably 0.05 to 3 mass % in terms of an effect, economical efficiency, and the like.

Examples of the acid scavenger include: phenyl glycidyl ether; alkyl glycidyl ether; alkylene glycol glycidyl ether; cyclohexeneoxide; α-olefinoxide; and an epoxy compound such as epoxidized soybean oil. Of those, phenyl glycidyl ether, alkyl glycidyl ether, alkylene glycol glycidyl ether, cyclohexeneoxide, or α-olefinoxide is preferable in terms of compatibility with the refrigerant.

Each of an alkyl group of the alkylglycidyl ether and an alkylene group of the alkylene glycol glycidyl ether may be branched, and has typically 3 to 30, preferably 4 to 24, or particularly preferably 6 to 16 carbon atoms. In addition, one having a total of generally 4 to 50, preferably 4 to 24, or particularly preferably 6 to 16 carbon atoms is used as the α-olefinoxide. In the present invention, one kind of the acid scavengers may be used, or two or more kinds thereof may be used in combination. In addition, the blending amount of the acid scavenger is in the range of preferably 0.005 to 5 mass % in ordinary cases, or particularly preferably 0.05 to 3 mass % with reference to the composition in terms of an effect and the suppression of the generation of sludge.

In the present invention, the stability of the refrigerator oil composition can be improved by blending the acid scavenger. The combined use of the extreme pressure agent and the antioxidant with the acid scavenger exerts an additional improving effect on the stability.

As the antifoaming agent, a silicone oil, a fluorinated silicone oil, and the like are exemplified.

In the refrigerator oil composition of the present invention, another known various additives, for example, a copper inactivator such as N—[N,N'-dialkyl (alkyl group having 3 to 12 carbon atoms) aminomethyl]triazole may be blended appropriately in the range of the blending amount which does not inhibit the purpose of the present invention.

The refrigerator oil composition of the present invention is applied to a refrigerator employing a refrigerant including at least one kind of fluorine-containing organic compounds selected from the compounds represented by the molecular formula (A) or a combination of the fluorine-containing organic compound and a saturated fluorinated hydrocarbon compound.

In addition, the refrigerator oil composition of the present invention is applied to a refrigerator employing a refrigerant including at least one kind of fluorine-containing organic compounds selected from fluorinated ether compounds, fluorinated alcohol compounds, and fluorinated ketone compounds, or a combination of the fluorine-containing organic compound and a saturated fluorinated hydrocarbon compound.

The used amounts of any one of the various refrigerants and the refrigerator oil composition in a method of lubricating a refrigerator that uses the refrigerator oil composition of the present invention are such that a mass ratio of the refrigerant to the refrigerator oil composition is in the range of preferably 99/1 to 10/90, or more preferably 95/5 to 30/70. The amount of the refrigerant below the above range is not preferable because a reduction in refrigerating capacity of the refrigerator is observed. In addition, the amount of the refrigerant beyond the above range is not preferable because the lubricity of the composition reduces. The refrigerator oil composition of the present invention, which can be used in any one of various refrigerators, is particularly preferably applicable to the compression refrigerating cycle of a compression refrigerator.

The refrigerator to which the refrigerator oil composition of the present invention is applied has a refrigerating cycle which essentially needs a constitute of a compressor, a condenser, an expansion mechanism (such as an expansion valve), and an evaporator, or a compressor, a condenser, an expansion mechanism, a drier, and an evaporator, uses the above-mentioned refrigerator oil composition of the present invention as a refrigerator oil, and uses the above-mentioned various refrigerants as refrigerants.

Here, the drier is preferably filled with a desiccant formed of zeolite having a pore diameter of 0.33 nm or less. In addition, as the zeolite, a natural zeolite or a synthetic zeolite may be exemplified. Zeolite having a $CO_2$ gas absorbing amount of 1.0% or less at 25° C. and a $CO_2$ gas partial pressure of 33 kPA is more suitable. As the synthetic zeolite described above, XH-9 (trade name), XH-600 (trade name) manufactured by UNION SHOWA K. K., and the like are exemplified.

In the present invention, if the desiccant is used, moisture can be removed efficiently without absorbing of the refrigerant in the refrigerating cycle, and simultaneously, powderization of the desiccant due to deterioration of the desiccant itself is suppressed. Therefore, there is no possibility of clogging of pipes caused by the powderization or abnormal wear caused by entering of the powder into a sliding part of the compressor, whereby the refrigerator can be driven stably for a long time period.

Various sliding parts (such as a bearing) are present in a compressor in a refrigerator to which the refrigerator oil composition of the present invention is applied. In the present invention, a part composed of engineering plastic, or a part having an organic or inorganic coating film is used as each of the sliding parts in terms of, in particular, sealing property.

Preferable examples of the engineering plastic include a polyamide resin, a polyphenylene sulfide resin, and a polyacetal resin in terms of sealing property, sliding property, wear resistance, and the like.

In addition, examples of the organic coating film include a fluorine-containing resin coating film (such as a polytetrafluoroethylene coating film), a polyimide coating film, and a polyamideimide coating film in terms of sealing property, sliding property, wear resistance, and the like.

On the other hand, examples of the inorganic coating film include a graphite film, a diamond-like carbon film, a nickel film, a molybdenum film, a tin film, and a chromium film in terms of sealing property, sliding property, wear resistance, and the like. The inorganic coating film may be formed by a plating treatment, or may be formed by a physical vapor deposition method (PVD).

It should be noted that a part composed of, for example, a conventional alloy system such as an Fe base alloy, an Al base alloy, or a Cu base alloy can also be used as each of the sliding parts.

The refrigerator oil composition of the present invention can be used in each of a car air conditioner, an electrically-driven air conditioner, a gas heat pump, an air conditioner, a cold storage, various hot water supply systems such as a vending machine or a showcase, and a refrigerating and heating system.

In the present invention, the water content in the system is preferably 300 mass ppm or less and more preferably 200 mass ppm or less. In addition, the residual air amount in the system is preferably 10 kPa or less and more preferably 5 kPa or less.

The refrigerator oil composition of the present invention mainly includes a specific oxygen-containing compound as a base oil, has so low viscosity that energy saving can be improved, and has excellent sealing property.

EXAMPLES

Next, the present invention is described in more detail by way of examples. However, the present invention is by no means limited by those examples.

It should be noted that properties of the base oil and various characteristics of the refrigerator oil composition were determined according to the following procedure.

<Properties of Base Oil>

(1) Kinematic Viscosity at 100° C.

The kinematic viscosity at 100° C. was measured according to JIS K2283-1983 by using a glass capillary viscometer.

(2) Flashing Point

The flashing point was measured according to JIS K2265 by C.O.C method.

(3) Number Average Molecular Weight

The number average molecular weight was measured by gel permeation chromatography (GPC).

<Various Characteristics of Refrigerator Oil Composition>

(4) Two-Layer Separation Temperature

A measuring tube for two-layer separation temperature (internal volume: 10 mL) was filled with water (0.6 g) and a refrigerant (2.4 g) and kept in a thermostatic chamber. The temperature in the thermostatic chamber was increased from room temperature (25° C.) at a rate of 1° C./min, whereby a two-layer separation temperature was measured.

(5) Stability (Sealed Tube Test)

A glass tube was filled with an oil (4 mL) and a refrigerant (1 g, water content of 200 ppm), and metal catalysts of iron, copper, and aluminum, and sealed. After the glass tube was kept at an air pressure of 26.6 kPa and at a temperature of 175° C. for 10 days, oil appearance, catalyst appearance, and the presence or absence of sludge were visually observed and the acid value was measured.

In addition, the kinds of components used in preparation of the refrigerator oil composition are described below.

(1) Base Oil

A1: polypropylene glycol dimethyl ether having a kinematic viscosity of 9.25 mm$^2$/s at 100° C., a flashing point of 212° C., and a number average molecular weight of 1,139

A2: polypropylene glycol (PPG)/polyethylene glycol (PEG) dimethyl ether (PPG/PEG molar ratio of 9/1) having a kinematic viscosity of 10.34 mm$^2$/s at 100° C., a flashing point of 223° C., and a number average molecular weight of 1,116

A3: polypropylene glycol/polyethylene glycol dimethyl ether (PPG/PEG molar ratio of 8/2) having a kinematic viscosity of 20.05 mm$^2$/s at 100° C., a flashing point of 230° C., and a number average molecular weight of 1,730

A4: polypropylene glycol methylnonylphenyl ether having a kinematic viscosity of 11.76 mm$^2$/s at 100° C., a flashing point of 220° C., and a number average molecular weight of 1,100

A5: polypropylene glycol dioctyl ether having a kinematic viscosity of 11.31 mm$^2$/s at 100° C., a flashing point of 219° C., and a number average molecular weight of 1,090

A6: polyethyl vinyl ether having a kinematic viscosity of 15.97 mm$^2$/s at 100° C., a flashing point of 222° C., and a number average molecular weight of 1,250

A7: a copolymer of polyethyl vinyl ether (PEV)/polyisobutyl vinyl ether (PIBV)(PEV/PIBV molar ratio of 9/1) having a kinematic viscosity of 8.26 mm$^2$/s at 100° C., a flashing point of 206° C., and a number average molecular weight of 830

A8: a copolymer of polypropylene glycol (PPG)/polyethyl vinyl ether (PEV)(PPG/PEV molar ratio of 7/11) having a kinematic viscosity of 9.56 mm$^2$/s at 100° C., a flashing point of 218° C., and a number average molecular weight of 1,200

A9: a copolymer of polyethylene glycol (PEG)/polyethyl vinyl ether (PEV)(PEG/PEV molar ratio of 3/21) having a kinematic viscosity of 17.64 mm$^2$/s at 100° C., a flashing point of 232° C., and a number average molecular weight of 1,680

A10: a copolymer of polypropylene glycol (PPG)/polyethyl vinyl ether (PEV)(PPG/PEV molar ratio of 16/5) having a kinematic viscosity of 13.49 mm$^2$/s at 100° C., a flashing point of 223° C., and a number average molecular weight of 1,280

A11: pentaerythritol octanoic acid (C8 acid) nonanoic acid (C9 acid) ester (C8 acid/C9 acid molar ratio of 1/1.1) having a kinematic viscosity of 9.64 mm$^2$/s at 100° C., a flashing point of 268° C., and a number average molecular weight of 670

A12: pentaerythritol octanoic acid nonanoic acid ester (C8 acid/C9 acid molar ratio of 1/1.7) having a kinematic viscosity of 15.99 mm$^2$/s at 100° C., a flashing point of 289° C., and a number average molecular weight of 685

A13: paraffin-based mineral oil having a kinematic viscosity of 10.68 mm$^2$/s at 100° C. and a flashing point of 266° C.

A14: alkyl benzene having a kinematic viscosity of 5.85 mm$^2$/s at 100° C. and a flashing point of 196° C.

(2) Additive

Extreme-pressure agent B1: tricresyl phosphate
Acid scavenger B2: C14 α-olefin oxide
Antioxidant B3: 2,6-di-t-butyl-4-methyl phenol
Antifoaming agent B4: silicone-based antifoaming agent In addition, the kinds of the used refrigerants are described below.

Ref1-1: 1,1,1-trifluorodimethyl ether
Ref1-2: 1,1,2-trifluorodimethyl ether
Ref1-3: 1,1,1,2-tetrafluorodimethyl ether
Ref1-4: 1,1,2,2-tetrafluorodimethyl ether
Ref1-5: a mixture of Ref1-2 and Ref1-4 (mass ratio of 1/1)
Ref2-1: trifluoromethyl alcohol
Ref2-2: difluoromethyl alcohol
Ref2-3: monofluoromethyl alcohol
Ref2-4: 1,1,1-trifluoroethyl alcohol
Ref2-5: 1,1,2-trifluoroethyl alcohol
Ref3-1: 1,1-difluoroacetone
Ref3-2: 1,1,1-trifluoroacetone
Ref3-3: 1,1,2-trifluoroacetone
Ref3-4: 1,1,1,2-tetrafluoroacetone
Ref3-5: a mixture of Ref3-1 and Ref3-3 (mass ratio of 1/1)

Examples 1 to 12 and Comparative Examples 1 and 2

Refrigerator oil compositions having the compositions shown in Table 1 were prepared. Ref1-1, Ref1-2, Ref1-3, Ref1-4, and Ref1-5, each of which was a refrigerant formed of a fluorinated ether compound shown in Table 1, were used, and characteristics of the compositions were evaluated. Table 1 shows the results.

TABLE 1

|  |  |  |  | Example | | | | | | |
|---|---|---|---|---|---|---|---|---|---|---|
|  |  |  |  | 1 | 2 | 3 | 4 | 5 | 6 | 7 |
| Blending composition | Base oil | Kind | | A1 | A2 | A3 | A4 | A5 | A6 | A7 |
|  |  | (Mass %) | | 97.5 | 97.5 | 97.499 | 97.499 | 97.5 | 97.5 | 97.5 |
|  | Additive (mass %) | Extreme pressure agent B1 | | 1.0 | 1.0 | 1.0 | 1.0 | 1.0 | 1.0 | 1.0 |
|  |  | Acid scavenger B2 | | 1.0 | 1.0 | 1.0 | 1.0 | 1.0 | 1.0 | 1.0 |
|  |  | Antioxidant B3 | | 0.5 | 0.5 | 0.5 | 0.5 | 0.5 | 0.5 | 0.5 |
|  |  | Antifoaming agent B4 | | — | — | 0.001 | 0.001 | — | — | — |
| Characteristics | Two-layer separation temperature (° C.) [oil content: 20 mass %] | Kind of refrigerant | Ref1-1 | 40< | 40< | 40< | 40< | 40< | 40< | 40< |
|  |  |  | Ref1-2 | 40< | 40< | 40< | 40< | 40< | 40< | 40< |
|  |  |  | Ref1-3 | 40< | 40< | 40< | 40< | 40< | 40< | 40< |
|  |  |  | Ref1-4 | 40< | 40< | 40< | 40< | 40< | 40< | 40< |
|  |  |  | Ref1-5 | 40< | 40< | 40< | 40< | 40< | 40< | 40< |
|  | Sealed tube test | Oil appearance | | Good | Good | Good. | Good | Good | Good | Good |

TABLE 1-continued

|  |  | | | | | | | |
|---|---|---|---|---|---|---|---|---|
|  | Catalyst appearance | Good | Good | Good | Good | Good | Good | Good |
|  | Presence or absence of sludge | Absent | Absent | Absent | Absent | Absent | Absent | Absent |
|  | Acid value (mgKOH/g) | 0.01> | 0.01> | 0.01> | 0.01> | 0.01> | 0.01> | 0.01> |

|  |  |  |  | Example | | | | | Comparative Example | |
|---|---|---|---|---|---|---|---|---|---|---|
|  |  |  |  | 8 | 9 | 10 | 11 | 12 | 1 | 2 |
| Blending compo-sition | Base oil | Kind | | A8 | A9 | A10 | A11 | A12 | A13 | A14 |
|  |  | (Mass %) | | 97.5 | 97.5 | 97.5 | 97.5 | 97.5 | 97.5 | 97.5 |
|  | Additive (mass %) | Extreme pressure agent B1 | | 1.0 | 1.0 | 1.0 | 1.0 | 1.0 | 1.0 | 1.0 |
|  |  | Acid scavenger B2 | | 1.0 | 1.0 | 1.0 | 1.0 | 1.0 | 1.0 | 1.0 |
|  |  | Antioxidant B3 | | 0.5 | 0.5 | 0.5 | 0.5 | 0.5 | 0.5 | 0.5 |
|  |  | Antifoaming agent B4 | | — | — | — | — | — | — | — |
| Charac-ter-istics | Two-layer separation temperature (° C.) [oil content: 20 mass %] | Kind of refrigerant | Ref1-1 | 40< | 40< | 40< | 40< | 40< | seperated at room temperature | seperated at room temperature |
|  |  |  | Ref1-2 | 40< | 40< | 40< | 40< | 40< | seperated at room temperature | seperated at room temperature |
|  |  |  | Ref1-3 | 40< | 40< | 40< | 40< | 40< | seperated at room temperature | seperated at room temperature |
|  |  |  | Ref1-4 | 40< | 40< | 40< | 40< | 40< | seperated at room temperature | seperated at room temperature |
|  |  |  | Ref1-5 | 40< | 40< | 40< | 40< | 40< | seperated at room temperature | seperated at room temperature |
|  | Sealed tube test | Oil appearance | | Good | Good | Good | Good | Good | — | — |
|  |  | Catalyst appearance | | Good | Good | Good | Good | Good | — | — |
|  |  | Presence or absence of sludge | | Absent | Absent | Absent | Absent | Absent | — | — |
|  |  | Acid value (mgKOH/g) | | 0.01> | 0.01> | 0.01> | 0.01> | 0.01> | — | — |

(Note)
Sealed tube test: Ref1-1 was used as a refrigerant.

As understood from Table 1, the refrigerator oil compositions (Examples 1 to 12) of the present invention have the two-layer separation temperature exceeding 40° C. with respect to all kinds of refrigerants Ref1-1 to Ref1-5 and have excellent stability in the sealed tube test using Ref1-1. On the contrary, in Comparative Examples 1 and 2, the refrigerator oil compositions are separated at room temperature with respect to all refrigerants Ref1-1 to Ref1-5.

Examples 13 to 24 and Comparative Examples 3 and 4

Refrigerator oil compositions having the compositions shown in Table 2 were prepared. Ref2-1, Ref2-2, Ref2-3, Ref2-4, and Ref2-5, each of which was a refrigerant formed of a fluorinated alcohol compound shown in Table 2, were used, and characteristics of the compositions were evaluated. Table 2 shows the results.

TABLE 2

|  |  |  |  | Example | | | | | | |
|---|---|---|---|---|---|---|---|---|---|---|
|  |  |  |  | 13 | 14 | 15 | 16 | 17 | 18 | 19 |
| Blending compo-sition | Base oil | Kind | | A1 | A2 | A3 | A4 | A5 | A6 | A7 |
|  |  | (Mass %) | | 97.5 | 97.5 | 97.499 | 97.499 | 97.5 | 97.5 | 97.5 |
|  | Additive (mass %) | Extreme pressure agent B1 | | 1.0 | 1.0 | 1.0 | 1.0 | 1.0 | 1.0 | 1.0 |
|  |  | Acid scavenger B2 | | 1.0 | 1.0 | 1.0 | 1.0 | 1.0 | 1.0 | 1.0 |
|  |  | Antioxidant B3 | | 0.5 | 0.5 | 0.5 | 0.5 | 0.5 | 0.5 | 0.5 |
|  |  | Antifoaming agent B4 | | — | — | 0.001 | 0.001 | — | — | — |
| Charac-ter-istics | Two-layer separation temperature (° C.) [oil content: 20 mass %] | Kind of refrigerant | Ref2-1 | 40< | 40< | 40< | 40< | 40< | 40< | 40< |
|  |  |  | Ref2-2 | 40< | 40< | 40< | 40< | 40< | 40< | 40< |
|  |  |  | Ref2-3 | 40< | 40< | 40< | 40< | 40< | 40< | 40< |
|  |  |  | Ref2-4 | 40< | 40< | 40< | 40< | 40< | 40< | 40< |
|  |  |  | Ref2-5 | 40< | 40< | 40< | 40< | 40< | 40< | 40< |
|  | Sealed tube test | Oil appearance | | Good | Good | Good. | Good | Good | Good | Good |
|  |  | Catalyst appearance | | Good | Good | Good | Good | Good | Good | Good |
|  |  | Presence or absence of sludge | | Absent | Absent | Absent | Absent | Absent | Absent | Absent |
|  |  | Acid value (mgKOH/g) | | 0.01> | 0.01> | 0.01> | 0.01> | 0.01> | 0.01> | 0.01> |

|  |  |  | Example | | | | | Comparative Example | |
|---|---|---|---|---|---|---|---|---|---|
|  |  |  | 20 | 21 | 22 | 23 | 24 | 3 | 4 |
| Blending compo-sition | Base oil | Kind | A8 | A9 | A10 | A11 | A12 | A13 | A14 |
|  |  | (Mass %) | 97.5 | 97.5 | 97.5 | 97.5 | 97.5 | 97.5 | 97.5 |
|  | Additive (mass %) | Extreme pressure agent B1 | 1.0 | 1.0 | 1.0 | 1.0 | 1.0 | 1.0 | 1.0 |
|  |  | Acid scavenger B2 | 1.0 | 1.0 | 1.0 | 1.0 | 1.0 | 1.0 | 1.0 |

TABLE 2-continued

|  |  |  | Antioxidant B3 | 0.5 | 0.5 | 0.5 | 0.5 | 0.5 | 0.5 | 0.5 |
|---|---|---|---|---|---|---|---|---|---|---|
|  |  |  | Antifoaming agent B4 | — | — | — | — | — | — | — |
| Charac-teristics | Two-layer separation temperature (° C.) [oil content: 20 mass %] | Kind of refrigerant | Ref2-1 | 40< | 40< | 40< | 40< | 40< | seperated at room temperature | seperated at room temperature |
|  |  |  | Ref2-2 | 40< | 40< | 40< | 40< | 40< | seperated at room temperature | seperated at room temperature |
|  |  |  | Ref2-3 | 40< | 40< | 40< | 40< | 40< | seperated at room temperature | seperated at room temperature |
|  |  |  | Ref2-4 | 40< | 40< | 40< | 40< | 40< | seperated at room temperature | seperated at room temperature |
|  |  |  | Ref2-5 | 40< | 40< | 40< | 40< | 40< | seperated at room temperature | seperated at room temperature |
|  | Sealed tube test | Oil appearance |  | Good | Good | Good | Good | Good | — | — |
|  |  | Catalyst appearance |  | Good | Good | Good | Good | Good | — | — |
|  |  | Presence or absence of sludge |  | Absent | Absent | Absent | Absent | Absent | — | — |
|  |  | Acid value (mgKOH/g) |  | 0.01> | 0.01> | 0.01> | 0.01> | 0.01> | — | — |

(Note)
Sealed tube test: Ref2-1 was used as a refrigerant.

As understood from Table 2, the refrigerator oil compositions (Examples 13 to 24) of the present invention have the two-layer separation temperature exceeding 40° C. with respect to all kinds of refrigerants Ref2-1 to Ref2-5 and have excellent stability in the sealed tube test using Ref2-1. On the contrary, in Comparative Examples 3 and 4, the refrigerator oil compositions are separated at room temperature with respect to all refrigerants Ref2-1 to Ref2-5.

Examples 25 to 36 and Comparative Examples 5 and 6

Refrigerator oil compositions having the compositions shown in Table 3 were prepared. Ref3-1, Ref3-2, Ref3-3, Ref3-4, and Ref3-5, each of which was a refrigerant formed of a fluorinated ketone compound shown in Table 3, were used, and characteristics of the compositions were evaluated. Table 3 shows the results.

TABLE 3

|  |  |  |  | Example |  |  |  |  |  |  |
|---|---|---|---|---|---|---|---|---|---|---|
|  |  |  |  | 25 | 26 | 27 | 28 | 29 | 30 | 31 |
| Blending composition | Base oil | Kind |  | A1 | A2 | A3 | A4 | A5 | A6 | A7 |
|  |  | (Mass %) |  | 97.5 | 97.5 | 97.499 | 97.499 | 97.5 | 97.5 | 97.5 |
|  | Additive (mass %) | Extreme pressure agent B1 |  | 1.0 | 1.0 | 1.0 | 1.0 | 1.0 | 1.0 | 1.0 |
|  |  | Acid scavenger B2 |  | 1.0 | 1.0 | 1.0 | 1.0 | 1.0 | 1.0 | 1.0 |
|  |  | Antioxidant B3 |  | 0.5 | 0.5 | 0.5 | 0.5 | 0.5 | 0.5 | 0.5 |
|  |  | Antifoaming agent B4 |  | — | — | 0.001 | 0.001 | — | — | — |
| Characteristics | Two-layer separation temperature (° C.) [oil content: 20 mass %] | Kind of refrigerant | Ref3-1 | 40< | 40< | 40< | 40< | 40< | 40< | 40< |
|  |  |  | Ref3-2 | 40< | 40< | 40< | 40< | 40< | 40< | 40< |
|  |  |  | Ref3-3 | 40< | 40< | 40< | 40< | 40< | 40< | 40< |
|  |  |  | Ref3-4 | 40< | 40< | 40< | 40< | 40< | 40< | 40< |
|  |  |  | Ref3-5 | 40< | 40< | 40< | 40< | 40< | 40< | 40< |
|  | Sealed tube test | Oil appearance |  | Good | Good | Good. | Good | Good | Good | Good |
|  |  | Catalyst appearance |  | Good | Good | Good | Good | Good | Good | Good |
|  |  | Presence or absence of sludge |  | Absent | Absent | Absent | Absent | Absent | Absent | Absent |
|  |  | Acid value (mgKOH/g) |  | 0.01> | 0.01> | 0.01> | 0.01> | 0.01> | 0.01> | 0.01> |

|  |  |  |  | Example |  |  |  |  | Comparative Example |  |
|---|---|---|---|---|---|---|---|---|---|---|
|  |  |  |  | 32 | 33 | 34 | 35 | 36 | 5 | 6 |
| Blending composition | Base oil | Kind |  | A8 | A9 | A10 | A11 | A12 | A13 | A14 |
|  |  | (Mass %) |  | 97.5 | 97.5 | 97.5 | 97.5 | 97.5 | 97.5 | 97.5 |
|  | Additive (mass %) | Extreme pressure agent B1 |  | 1.0 | 1.0 | 1.0 | 1.0 | 1.0 | 1.0 | 1.0 |
|  |  | Acid scavenger B2 |  | 1.0 | 1.0 | 1.0 | 1.0 | 1.0 | 1.0 | 1.0 |
|  |  | Antioxidant B3 |  | 0.5 | 0.5 | 0.5 | 0.5 | 0.5 | 0.5 | 0.5 |
|  |  | Antifoaming agent B4 |  | — | — | — | — | — | — | — |
| Characteristics | Two-layer separation temperature (° C.) [oil content: 20 mass %] | Kind of refrigerant | Ref3-1 | 40< | 40< | 40< | 40< | 40< | seperated at room temperature | seperated at room temperature |
|  |  |  | Ref3-2 | 40< | 40< | 40< | 40< | 40< | seperated at room temperature | seperated at room temperature |
|  |  |  | Ref3-3 | 40< | 40< | 40< | 40< | 40< | seperated at room temperature | seperated at room temperature |
|  |  |  | Ref3-4 | 40< | 40< | 40< | 40< | 40< | seperated | seperated |

TABLE 3-continued

|  |  | Ref3-5 | 40< | 40< | 40< | 40< | 40< | at room temperature seperated at room temperature | at room temperature seperated at room temperature |
|---|---|---|---|---|---|---|---|---|---|
| Sealed tube test | Oil appearance | Good | Good | Good | Good | Good | — | — |
|  | Catalyst appearance | Good | Good | Good | Good | Good | — | — |
|  | Presence or absence of sludge | Absent | Absent | Absent | Absent | Absent | — | — |
|  | Acid value (mgKOH/g) | 0.01> | 0.01> | 0.01> | 0.01> | 0.01> | — | — |

(Note)
Sealed tube test: Ref3-2 was used as a refrigerant.

As understood from Table 3, the refrigerator oil compositions (Examples 25 to 36) of the present invention have the two-layer separation temperature exceeding 40° C. with respect to all kinds of refrigerants Ref3-1 to Ref3-5 and have excellent stability in the sealed tube test using Ref3-2. On the contrary, in Comparative Examples 5 and 6, the refrigerator oil compositions are separated at room temperature with respect to all refrigerants Ref3-1 to Ref3-5.

INDUSTRIAL APPLICABILITY

The lubricating oil composition for a refrigerator of the present invention is used for a refrigerator that uses, as a refrigerant, a fluorine-containing organic compound which is a refrigerant applicable to, in particular, current car air conditioner systems or the like, has a specific polar structure and has a low global warming potential.

The invention claimed is:

1. A method of lubricating a refrigerator, wherein the refrigerator includes a refrigerant comprising at least one fluorine-containing organic compounds selected from compounds represented by the following molecular formula (A) or including a combination of the fluorine-containing organic compound and a saturated fluorinated hydrocarbon compound, $$C_pO_gF_rR_s \quad (A)$$

wherein R represents Cl, Br, I, or H; p represents an integer of 1 to 6, q represents an integer of 0 to 2, r represents an integer of 1 to 14, and s represents an integer of 0 to 13; and provided that, when q represents 0, p represents 2 to 6 and one or more carbon-carbon unsaturated bonds are included in the molecule, comprising providing in the refrigerator a lubricating composition comprising a base oil including as a main component at least one member selected from the group consisting of copolymers of poly(oxy)alkylene glycols or monoethers thereof and polyvinyl ethers represented by formula (VIII):

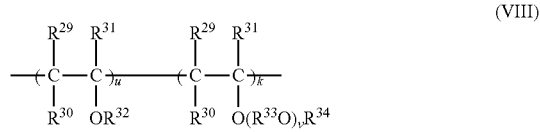

wherein:
$R^{29}$, $R^{30}$, and $R^{31}$ each represent a hydrogen atom,
$R^{33}$ represents a divalent hydrocarbon group having 2 to 4 carbon atoms,
$R^{34}$ represents an alkyl group having 1 to 10 carbon atoms,
$R^{32}$ represents a hydrocarbon group having 1 to 10 carbon atoms, and
when multiple $R^{34}$'s, $R^{33}$'s, and $R^{32}$'s are present, multiple $R^{34}$'s, $R^{33}$'s, and $R^{32}$'s may be identical to or different from one another,
u is in the range of 2 to 25,
k is in the range of 1 to 50,
v is in the range of 1 to 4, and
wherein the copolymers of poly(oxy)alkylene glycols or monoethers thereof and polyvinyl ethers represented by formula (VIII) have terminals represented by formula (XV), (XVI), (XVII) or (XVIII):

wherein $R^{29}$, $R^{30}$, $R^{31}$, $R^{32}$, $R^{33}$ and $R^{34}$ are as defined above.

2. A method of lubricating a refrigerator, wherein the refrigerator includes a refrigerant comprising at least one fluorine-containing organic compounds selected from the group consisting of a fluorinated ether compound, a fluorinated alcohol compound, and a fluorinated ketone compound, or including a combination of the fluorine-containing organic compound and a saturated fluorinated hydrocarbon compound, comprising providing in the refrigerator a lubricating composition comprising a base oil including as a main component at least one member selected from the group consisting of copolymers of poly(oxy)alkylene glycols or monoethers thereof and polyvinyl ethers represented by formula (VIII):

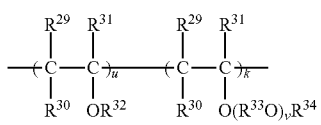

wherein:

$R^{29}$, $R^{30}$, and $R^{31}$ each represent a hydrogen atom, $R^{33}$ represents a divalent hydrocarbon group having 2 to 4 carbon atoms, $R^{34}$ represents an alkyl group having 1 to 10 carbon atoms, $R^{32}$ represents a hydrocarbon group having 1 to 10 carbon atoms, and when multiple $R^{34}$'s, $R^{33}$'s, and $R^{32}$'s are present, multiple $R^{34}$'s, $R^{33}$'s, and $R^{32}$'s may be identical to or different from one another, u is in the range of 2 to 25, k is in the range of 1 to 50, v is in the range of 1 to 4, and wherein the copolymers of poly(oxy)alkylene glycols or monoethers thereof and polyvinyl ethers represented by formula (VIII) have terminals represented by formula (XV), (XVI), (XVII) or (XVIII):

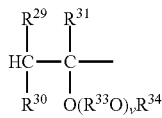

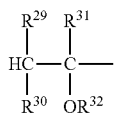

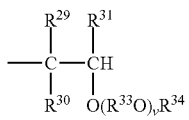

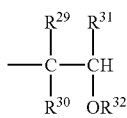

wherein $R^{29}$, $R^{30}$, $R^{31}$, $R^{32}$, $R^{33}$ and $R^{34}$ are as defined above.

3. The method of claim 1, wherein the base oil has a kinematic viscosity of 2 to 50 mm²/s at 100° C.

4. The method of claim 2, wherein the base oil has a kinematic viscosity of 2 to 50 mm²/s at 100° C.

5. The method of claim 1, wherein the base oil has a number average molecular weight of 500 or more.

6. The method of claim 2, wherein the base oil has a number average molecular weight of 500 or more.

7. The method of claim 1, wherein the base oil has a flash point of 150° C. or higher.

8. The method of claim 2, wherein the base oil has a flash point of 150° C. or higher.

9. The method of claim 1, further comprising at least one kind of an additive selected from an extreme pressure agent, an oiliness agent, an antioxidant, an acid scavenger, and an anti-foaming agent.

10. The method of claim 2, further comprising at least one kind of an additive selected from an extreme pressure agent, an oiliness agent, an antioxidant, an acid scavenger, and an anti-foaming agent.

11. The method of claim 1, wherein the fluorine-containing organic compound in the refrigerant is a fluorinated dimethyl ether.

12. The method of claim 2, wherein the fluorine-containing organic compound in the refrigerant is a fluorinated dimethyl ether.

13. The method of claim 1, wherein the fluorine-containing organic compound in the refrigerant is a fluorinated methyl alcohol.

14. The method of claim 2, wherein the fluorine-containing organic compound in the refrigerant is a fluorinated methyl alcohol.

15. The method of claim 1, wherein the fluorine-containing organic compound in the refrigerant is a fluorinated acetone.

16. The method of claim 2, wherein the fluorine-containing organic compound in the refrigerant is a fluorinated acetone.

17. The method of claim 1, wherein the saturated fluorinated hydrocarbon compound in the refrigerant is at least one kind selected from 1,1-difluoroethane, trifluoroethane, tetrafluoroethane, and pentafluoroethane.

18. The method of claim 2, wherein the saturated fluorinated hydrocarbon compound in the refrigerant is at least one kind selected from 1,1-difluoroethane, trifluoroethane, tetrafluoroethane, and pentafluoroethane.

19. The method of claim 1, wherein the refrigerator also includes a sliding part in a refrigerator, wherein the sliding part is formed of an engineering plastic or includes an organic coating film or an inorganic coating film.

20. The method of claim 1, wherein the refrigerator also includes a sliding part in a refrigerator, wherein the sliding part is formed of an engineering plastic or includes an organic coating film or an inorganic coating film.

21. The method of claim 19, wherein the organic coating film is a polytetrafluoroethylene coating film, a polyimide coating film, or a polyamideimide coating film.

22. The method of claim 20, wherein the inorganic coating film is a graphite film, a diamond-like carbon film, a tin film, a chromium film, a nickel film, or a molybdenum film.

23. The method of claim 1, wherein the refrigerator is in a car air conditioner, an electrically-driven car air conditioner, a gas heat pump, an air conditioner, a cold storage, various hot-water supply systems for a vending machine or a showcase, or a refrigerating and heating system.

24. The method of claim 2, wherein the refrigerator is in a car air conditioner, an electrically-driven car air conditioner, a gas heat pump, an air conditioner, a cold storage, various hot-water supply systems for a vending machine or a showcase, or a refrigerating and heating system.

25. The method of claim 23, wherein the water content in the car air conditioner, an electrically-driven car air conditioner, a gas heat pump, an air conditioner, a cold storage, various hot-water supply systems for a vending machine or a showcase, or a refrigerating and heating system is 300 mass ppm or less and the residual air content in the car air conditioner, an electrically-driven car air conditioner, a gas heat pump, an air conditioner, a cold storage, various hot-water supply systems for a vending machine or a showcase, or a refrigerating and heating system is 10 kPa or less.

26. The method of claim 24, wherein the water content in the car air conditioner, an electrically-driven car air conditioner, a gas heat pump, an air conditioner, a cold storage, various hot-water supply systems for a vending machine or a showcase, or a refrigerating and heating system is 300 mass ppm or less and the residual air content in the car air conditioner, an electrically-driven car air conditioner, a gas heat pump, an air conditioner, a cold storage, various hot-water supply systems for a vending machine or a showcase, or a refrigerating and heating system is 10 kPa or less.

* * * * *